US 7,666,821 B2

(12) United States Patent
Fu

(10) Patent No.: US 7,666,821 B2
(45) Date of Patent: *Feb. 23, 2010

(54) SELF-DIVERTING PRE-FLUSH ACID FOR SANDSTONE

(75) Inventor: Diankui Fu, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 572 days.

This patent is subject to a terminal disclaimer.

(21) Appl. No.: 10/370,633

(22) Filed: Feb. 20, 2003

(65) Prior Publication Data

US 2004/0009880 A1  Jan. 15, 2004

Related U.S. Application Data

(63) Continuation-in-part of application No. 10/191,179, filed on Jul. 9, 2002, now Pat. No. 6,929,070.

(51) Int. Cl.
C09K 8/60 (2006.01)

(52) U.S. Cl. .................. 507/244; 507/203; 507/266; 507/267; 507/277; 507/245

(58) Field of Classification Search ................. 507/244, 507/203, 266, 267, 277, 245
See application file for complete search history.

(56) References Cited

U.S. PATENT DOCUMENTS

| | | | | |
|---|---|---|---|---|
| 3,724,549 A | | 4/1973 | Walter | 166/282 |
| 4,007,789 A | * | 2/1977 | Clampitt | 166/281 |
| 4,324,669 A | | 4/1982 | Norman et al. | 252/8.55 |
| 4,591,447 A | * | 5/1986 | Kubala | 507/240 |
| 4,695,389 A | | 9/1987 | Kubala | 252/8.553 |
| 4,790,958 A | * | 12/1988 | Teot | 507/237 |
| 4,807,703 A | | 2/1989 | Jennings, Jr. | 166/307 |
| 5,360,558 A | * | 11/1994 | Pakulski et al. | 507/202 |
| 5,979,557 A | | 11/1999 | Card et al. | 166/300 |
| 6,035,936 A | | 3/2000 | Whalen | 166/308 |
| 6,148,917 A | * | 11/2000 | Brookey et al. | 166/301 |
| 6,258,859 B1 | * | 7/2001 | Dahayanake et al. | 516/77 |

(Continued)

FOREIGN PATENT DOCUMENTS

CA    1109356    9/1981

(Continued)

OTHER PUBLICATIONS

U.S. Appl. No. 10/065,144—*A Novel Fluid System having Controllable Reversible Viscosity*.

(Continued)

Primary Examiner—Randy Gulakowski
Assistant Examiner—Alicia M Toscano
(74) Attorney, Agent, or Firm—David Cate; Rachel Greene; Robin Nava

(57) ABSTRACT

Embodiments of the Present Invention relate to a reversibly thickenable non-polymeric fluid that has low viscosity in strong acid, gels when the acid concentration is reduced by only a small amount, and is subsequently decomposed by the acid. In particular it relates to an aqueous mixture of zwitterionic surfactants, inorganic acids, and organic acids Most particularly it relates to the use of this fluid as a diverting agent for easily-damaged sandstones, for example prior to matrix acidizing.

19 Claims, 12 Drawing Sheets

U.S. PATENT DOCUMENTS

| | | | |
|---|---|---|---|
| 6,306,800 B1 | 10/2001 | Samuel et al. | 507/129 |
| 6,367,548 B1 | 4/2002 | Purvis et al. | 166/281 |
| 6,399,546 B1 * | 6/2002 | Chang et al. | 507/240 |
| 6,435,277 B1 | 8/2002 | Qu et al. | 166/281 |
| 6,482,866 B1 | 11/2002 | Dahayanake et al. | 516/77 |
| 6,497,290 B1 | 12/2002 | Misselbrook et al. | 166/384 |
| 6,569,814 B1 * | 5/2003 | Brady et al. | 507/201 |
| 6,605,570 B2 * | 8/2003 | Miller et al. | 507/211 |
| 6,637,517 B2 * | 10/2003 | Samuel et al. | 166/381 |
| 6,667,280 B2 | 12/2003 | Chang et al. | 507/240 |
| 6,703,352 B2 | 3/2004 | Dahayanake et al. | 507/241 |
| 2002/0004464 A1 | 1/2002 | Nelson et al. | 507/200 |
| 2002/0023752 A1 | 2/2002 | Qu et al. | 166/308 |
| 2002/0033260 A1 * | 3/2002 | Lungwitz et al. | 166/278 |
| 2002/0147114 A1 * | 10/2002 | Dobson et al. | 507/242 |
| 2003/0119680 A1 * | 6/2003 | Chang et al. | 507/200 |
| 2003/0134751 A1 | 7/2003 | Lee et al. | 507/200 |
| 2003/0139298 A1 * | 7/2003 | Fu et al. | 507/200 |
| 2004/0009880 A1 | 1/2004 | Fu | 507/200 |
| 2004/0176478 A1 * | 9/2004 | Dahayanake et al. | 516/77 |
| 2005/0067165 A1 | 3/2005 | Cawiezel et al. | 166/307 |
| 2005/0107265 A1 | 5/2005 | Sullivan et al. | 507/271 |

FOREIGN PATENT DOCUMENTS

| | | |
|---|---|---|
| GB | 2012837 | 8/1979 |
| GB | 2354541 | 8/2001 |
| GB | 2372058 | 8/2002 |
| WO | 01/29369 | 4/2001 |
| WO | 03/054352 | 7/2003 |
| WO | 03/093641 | 11/2003 |

OTHER PUBLICATIONS

SPE 80274—*Application of Novel Diversion Acidizing Techniques to Improve Gas Production in Heterogeneous Formation* By Xugang Wang, Honglan Zou, Jun Tian, Fuxiang Zhang, Xingsheng Cheng and Suzhen Li, Feb. 2003.

SPE 56529 Case Study of a Novel Acid-Diversion Technique in Carbonate Reservoirs. F.F.Chang, T.Love, C.J.Affeld, J.B.Blevins III, R.L.Thomas, and D.K.Fu.

* cited by examiner

SELF-DIVERTING PRE-FLUSH ACID FOR SANDSTONE

TECHNICAL FIELD OF THE INVENTION

This application is a Continuation-in-Part of U.S. patent application Ser. No. 10/191,179 filed Jul. 9, 2002 now U.S. Pat No. 6,929,070. It relates to a reversibly thickenable fluid that has low viscosity in strong acid, gels when the acid concentration is reduced by only a small amount, and is subsequently decomposed by the acid. More particularly it relates to the use of this fluid as a diverting agent specifically for sandstone matrix acidizing.

BACKGROUND OF THE INVENTION

Hydrocarbons are produced from an underground reservoir formation in which they are trapped through a wellbore that is drilled into the formation. The term "oil" is used generically to include gas and condensate. The reservoir formations are typically either sandstones or carbonates. Formations that are considered to be carbonate may contain some sandstone and vice versa. Oil will flow through the formation rock if it has pores of sufficient size and number to allow a flowpath for the oil to move through the formation. In order for oil to be produced, that is, travel from the formation to the wellbore (and ultimately to the surface) there must also be a sufficiently unimpeded flowpath from the formation to the wellbore.

One of the most common reasons for a decline in oil production is damage to the formation, which at least partially plugs the rock pores and therefore impedes the flow of oil. Sources of formation damage include: particles that have coated the wellbore face or invaded the near-wellbore matrix from the drilling and/or completion fluid; particles that were part of the formation that have been mobilized by drilling, completion or production; and paraffins, asphaltenes, or minerals that have precipitated due to mixing of incompatible fluids or to temperature or pressure changes (precipitated minerals are commonly called scale). This damage generally arises from another fluid deliberately injected into the wellbore, for instance, drilling or completion fluid. The natural effect of all of this damage is to decrease permeability to oil moving from the formation in the direction of the wellbore.

Another reason for lower-than-expected production may be that the formation is naturally "tight" (low permeability); that is, the pores are sufficiently small that the oil migrates toward the wellbore only very slowly. The common denominator in both cases (damage and naturally tight reservoirs) is low permeability. Techniques performed by hydrocarbon producers to increase the net permeability of the reservoir are referred to as "stimulation techniques." Essentially, one can perform a stimulation technique by: (1) injecting chemicals through the wellbore and into the formation to react with and dissolve the wellbore and/or near-wellbore damage (2) injecting chemicals through the wellbore and into the formation to react with and dissolve small portions of the formation to create alternative flowpaths for the hydrocarbon (thus rather than removing the damage, redirecting the migrating oil around the damage); or (3) injecting chemicals through the wellbore and into the formation at pressures sufficient to actually fracture the formation, thereby creating a large flow channel through which hydrocarbon can more readily move from the formation and into the wellbore. Processes (1) and (2) are called "matrix stimulation," commonly "matrix acidizing" since the chemicals are usually acids or acid-based fluids (although they may be other formation-dissolving materials such as certain chelating agents such as aminopolycarboxylic acids), and process (3) can be either "acid fracturing" or "hydraulic fracturing". Process (1) is typically applied in sandstone reservoirs because sandstones are usually as difficult or more difficult to dissolve than are the contributors to the damage. Process (2) is typically applied in carbonates because carbonates are usually easier to dissolve than some or all of the damaging materials. Process (3) is applied to both lithologies.

Embodiments of the Present Invention are directed primarily to the first of these three processes. At present, matrix acidizing treatments, including the sandstone matrix acidizing treatments that are the subject of the remainder of this discussion, are plagued primarily by four very serious limitations: (1) inadequate radial penetration; (2) incomplete axial distribution; (3) corrosion of the pumping and well bore tubing (which will not be considered further here); and (4) damage to the formation caused by the acid itself. Embodiments of the Present Invention are directed primarily to the second and fourth problems.

The first problem, inadequate radial penetration, is caused by the fact that when the acid is introduced into the formation it reacts with the damaging material and/or formation matrix, with which it first comes into contact. (This is usually at or near the wellbore, and we will discuss the problem as though that were the case, although in some instances—for example where there are natural fractures—the location at which the majority of first contact of the treatment fluid with the formation occurs may be distant from the wellbore.) The formation near the wellbore that first contacts the acid is adequately treated, though portions of the formation more distal to the wellbore (as one moves radially, outward from the wellbore) remain untouched by the acid—since all of the acid reacts before it can get there. For instance, sandstone formations are often treated with a mixture of hydrofluoric and hydrochloric acids at sufficiently low injections rates as to avoid fracturing the formation. This acid mixture is often selected because it will dissolve clays (found in drilling mud) as well as the primary constituents of naturally occurring sandstones (e.g., silica, feldspar, and calcareous material). In fact, the dissolution may be so effective that the injected acid is essentially spent by the time it reaches a few inches beyond the wellbore. Thus, one can calculate that over 100 gallons of acid per foot is required to fill a region five feet from the wellbore (assuming 20% porosity and 6-inch wellbore diameter). In fact, due to such limited penetration, it is believed that sandstone matrix treatments do not provide significant stimulation beyond what is achieved through near-wellbore damage removal. Yet damage at any point along the hydrocarbon flowpath can impede flow (hence production). Therefore, because of the prodigious fluid volumes required, these treatments are severely limited by their cost.

A second major problem that severely limits the effectiveness of matrix acidizing technology is incomplete axial distribution. This problem relates to the proper placement of the acid-containing fluid—i.e., ensuring that it is delivered to the desired zone (i.e., the zone that needs stimulation) rather than another zone. (Hence this problem is not related per se to the effectiveness of the acid-containing fluid.) More particularly, when an oil-containing formation is injected with acid, the acid begins to dissolve the damage and/or the matrix. Depending upon the reactivity of the acid with the matrix and the flow rate of acid to the reaction location, as one continues to pump the acid into the formation, a dominant channel through the matrix is very often created. As one continues to pump acid into the formation, the acid will naturally flow along that newly created channel—i.e., the path of least resistance—and therefore leave the rest of the formation substantially untreated. In matrix stimulation, the formation of such channels, commonly called wormholes, is usually undesirable. This behavior is exacerbated by intrinsic permeability heterogeneity (common in many formations) especially natural fractures in the formation and high permeability streaks. Again, these regions of heterogeneity in essence attract large amounts of the injected acid, hence keeping the acid from reaching other parts of the formation along the wellbore—where it is actually desired most. Thus, in many cases, a substantial fraction of the productive, oil-bearing intervals within the zone to be treated are not contacted by acid sufficient to penetrate deep enough (laterally in the case of a vertical wellbore) into the formation matrix to effectively increase its permeability and therefore its capacity for delivering oil to the wellbore. This problem of proper placement is a particularly vexing one since the injected fluid will preferentially migrate to higher permeability zones (the path of least resistance) rather than to the lower permeability zones—yet it is those latter zones which require the acid treatment (i.e., because they are low permeability zones, the flow of oil through them is diminished). In response to this problem, numerous, disparate techniques have evolved to achieve more controlled placement of the fluid—i.e., to divert the acid away from naturally high permeability zones and zones already treated, and towards the regions of interest.

The techniques to control acid placement (i.e., to ensure effective zone coverage) can be roughly divided into either mechanical or chemical techniques. Mechanical techniques include ball sealers (balls dropped into the wellbore and that plug the perforations in the well casing, thus sealing the perforation against fluid entry); packers and bridge plugs, particularly including straddle packers (mechanical devices that plug a portion of the wellbore and thereby inhibit fluid entry into the perforations around that portion of the wellbore); coiled tubing (flexible tubing deployed by a mechanized reel, through which the acid can be delivered with more precise locations within the wellbore); and bullheading (attempting to achieve diversion by pumping the acid at the highest possible pressure—just below the pressure that would actually fracture the formation). Chemical techniques can be further divided into ones that chemically modify the wellbore adjacent to portions of the formation for which acid diversion is desired, and ones that modify the acid-containing fluid itself. The first type involve materials that form a reduced-permeability cake on the wellbore face which upon contact with the acid, will divert it to higher permeability regions particulate material. These are typically either oil-soluble or water-soluble particulates that are directed at the high permeability zones to plug them and therefore divert acid flow to the low permeability zones. The second type includes foaming agents, emulsifying agents, and gelling agents. Mechanical methods and chemical methods that chemically modify the wellbore adjacent to portions of the formation for which acid diversion is desired will not be considered further here.

Emulsified acid systems and foamed systems are commercially available responses to the diversion problem, but they are fraught with operational complexity which severely limits their use—e.g., flow rates of two fluids, and bottom hole pressure must be meticulously monitored during treatment. That leaves gelling agents—the class of diverters to which Embodiments of the Present Invention belong. Though they are commercially available, gelling agents are quite often undesirable in matrix acidizing since the increased viscosity makes the fluid more difficult to pump (i.e., the same resistance to flow that confers the pressure build-up in the formation and results in the desired diversion, actually makes these fluids difficult to pump). Some commercially available systems are polymeric cross-linked systems—i.e., they are linear polymers when pumped but a chemical agent pumped along with the polymer causes the polymers to aggregate or cross-link once in the wellbore, which results in gelling. Unfortunately, these systems leave a residue in the formation, which can damage the formation, resulting in diminished hydrocarbon production. Severe well plugging, particularly in low pressure wells, caused by these systems has been well documented. In addition, the success of these systems is naturally dependent upon a very sensitive chemical reaction—the cross-linking—which is very difficult to optimize so that it is delayed during pumping but maximized once the chemicals are in the wellbore. This reaction is easily perturbed by formation chemistry, contaminants in the pumping equipment, and so forth. And again, once these systems are in place, they are difficult to remove—to do so requires that they be somehow un-cross linked and/or that the polymer be destroyed.

Viscoelastic surfactant-based gelling systems can avoid these problems. One viscoelastic surfactant-based gelling system is disclosed in U.S. Pat. Nos. 5,979,557 and 6,435,277, which have a common assignee as the present application. This system differs from Embodiments of the Present Invention in that it is not a self-diverting system—i.e., the treatment is performed in two steps: (1) injecting the diverter, followed by (2) injecting the acid. The treatments based on the fluids of Embodiments of the Present Invention are based on a single step—hence it is chemically very different—because the diverter is contained within the acid-containing fluid.

Another viscoelastic surfactant-based gelling system is disclosed in U.S. Pat. No. 6,399,546, and U.S. patent application Ser. No. 10/065,144, which also have a common assignee as the present application. This system, which we will call "VDA" here (for "viscoelastic diverting acid") was developed for carbonate matrix acidizing and may contain one of certain zwitterionic surfactants, such as those based on betaines (which are described in U.S. Pat. No. 6,258,859, and which we will call BET surfactants), an acid that is hydrochloric, hydrofluoric, a mixture of hydrochloric and hydrofluoric, acetic or formic acid, and (for some BET surfactants) a required co-surfactant or (for other BET surfactants) optional methanol, ethanol or isopropanol. The acid is not a mixture of inorganic and organic acids. The initially injected fluid has a nearly water-like viscosity, but after a considerable portion of the acid "spends," or has been consumed, (which is possible because it is being injected into a carbonate formation that will react with a large amount of acid) the viscosity increases substantially. Thus, when first injected, VDA's enter the most permeable zone(s), but when they gel they block that zone or zones and divert subsequently injected fluid into previously less-permeable zones. The success of such systems depends upon the ability of the formation to react with a large amount of acid. Consequently, they are most useful with carbonates that have a large capacity to react with acid.

SPE paper 80274, "Application of Novel Diversion Acidizing Techniques To Improve Gas Production in Heterogeneous Formation," describes a "diversion acid" that is a strong gel when injected. There is no indication of the chemistry; a breaker is required.

A need exists for a diversion system that will be effective in sandstones—i.e., a fluid that is not damaged by shear, has a low viscosity during pumping, that gels quickly once it contacts sandstone, that forms a gel of sufficient strength to allow diversion to occur, and that is immediately and nearly completely "broken" or returned to the un-gelled state, without the need for a breaker, after the treatment has ceased so the well can be put back on production. Furthermore, this fluid must not only be self-diverting, but it must also divert subsequently-injected fluids until a treatment is completed.

SUMMARY OF EMBODIMENTS OF THE INVENTION

One embodiment of the invention is a self-diverting pre-flush sandstone acid made by combining water, an acid-hydrolyzable surfactant capable of forming a viscoelastic gel, an inorganic acid, and an organic acid. The surfactant may have the following amide structure:

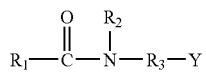

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 10 carbon atoms; and Y is an electron withdrawing group, especially a quaternary amine, an amine oxide, a sulfonate or a carboxylic acid, that renders the amide group difficult to hydrolyze. Preferably, the surfactant is a betaine having the structure:

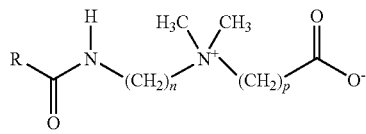

in which R is a hydrocarbyl group that may be branched or straight chained, aromatic, aliphatic or olefinic and has from about 14 to about 26 carbon atoms and may contain an amine; n=about 2 to about 10; and p=1 to about 5, or mixtures of these compounds. A preferred surfactant is a betaine in which R is an alkene side chain having from about 17 to about 22 carbon atoms, n=about 3 to about 5, and p=1 to about 3, and mixtures of these compounds. Most preferred surfactants are those in which the surfactant is a betaine having the structure:

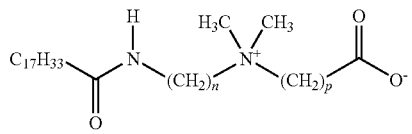

in which n=3 and p=1, or a betaine having the structure:

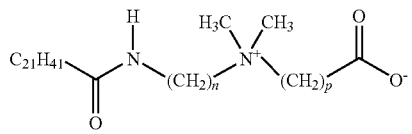

in which n=3 and p=1.

In preferred embodiments, the inorganic acid is hydrochloric acid, sulfuric acid, or nitric acid (especially hydrochloric acid); the organic acid is formic acid, citric acid, acetic acid, boric acid, lactic acid, methyl sulfonic acid or ethyl sulfonic acid (especially formic acid, acetic acid and citric acid).

In another preferred embodiment, the self-diverting pre-flush sandstone acid also contains an alcohol selected from the group consisting of methanol, ethanol, propanol, isopropanol, ethylene glycol and propylene glycol (especially methanol).

In particularly preferred embodiments, the surfactant is present in an amount between about 1 to about 6 weight percent active ingredient, preferably from about 2 to about 4%, most preferably about 3%; the inorganic acid is present in an amount between about 6 to about 20 weight percent, preferably from about 6 to about 15%, most preferably about 12%; and the organic acid is present in an amount between about 1 to about 20 weight percent, preferably from about 5 to about 10%, most preferably about 6%. The self-diverting pre-flush sandstone acid may also contain one or more of a corrosion inhibitor, an iron control agent, and a chelating agent.

In another embodiment, the self-diverting pre-flush sandstone acid is made by combining water, an acid-hydrolyzable surfactant (as above) capable of forming a viscoelastic gel, an organic acid (as above), and an inorganic acid (as above) and the fluid is capable of an increase in viscosity of at least about 50 cP at 170 sec$^{-1}$ upon neutralization of less than about one third of the total acid by reaction with carbonate ion. In yet another embodiment, the self-diverting pre-flush sandstone acid is made by combining water, an acid-hydrolyzable surfactant (as above) capable of forming a viscoelastic gel, and an organic acid (as above), and the fluid is capable of an increase in viscosity of at least about 50 cP at 170 sec$^{-1}$ upon neutralization of less than about one third of the total acid by reaction with carbonate ion.

Yet another embodiment is a method of treating a sandstone formation having a non-target zone or zones and a target zone or zones penetrated by a wellbore involving injecting a self-diverting pre-flush sandstone acid comprising water, an acid-hydrolyzable surfactant capable of forming a viscoelastic gel, an inorganic acid, and an organic acid into the wellbore to selectively block the pore structure in the non-target zone or zones. Yet another embodiment is a method of treating a sandstone formation having a non-target zone or zones and a target zone or zones penetrated by a wellbore involving injecting a self-diverting pre-flush sandstone acid comprising water, an acid-hydrolyzable surfactant capable of forming a viscoelastic gel, an inorganic acid, and an organic acid into the wellbore to selectively block the pore structure in the non-target zone or zones in order to selectively retard entry of fluid into the non-target zone or zones and thus to allow entry of fluid into the target zone or zones; and then injecting a matrix stimulation fluid into the formation, so that the matrix stimulation fluid is diverted from the non-target zone or zones into the target zone or zones. Other embodiments include the above methods in which the self-diverting pre-flush sandstone acid does not contain an inorganic acid. Yet other embodiments include the above methods in which the self-diverting pre-flush sandstone acid contains an alcohol as described above. Yet other embodiments include the above methods in which the surfactant, organic acid, and inorganic acid are of the types and in the concentrations as described above.

Other embodiments include any of the above methods in which a mutual solvent, selected from low molecular weight esters, ethers and alcohols (especially ethylene glycol monobutyl ether) is injected prior to injecting the self-diverting pre-flush sandstone acid. Other embodiments include any of the above methods in which the step of injecting a self-diverting pre-flush sandstone acid forms a plug of a viscous fluid in the pore structure of the non-target zone or zones; any of the above methods in which an organic acid pre-flush fluid or an inorganic acid pre-flush fluid (optionally containing an organic acid) is injected after the step of injecting the self-diverting pre-flush sandstone acid and before the step of injecting the matrix stimulation fluid into the formation; any of the above methods in which an acidic pre-flush fluid is used and the pre-flush fluid and the self-diverting pre-flush sandstone acid include the same organic acid and the same inorganic acid, each at about the same concentration; and any of the above methods in which the surfactant hydrolyzes after the injection of the matrix stimulation fluid.

DETAILED DESCRIPTION OF PREFERRED EMBODIMENTS

Figure 1:
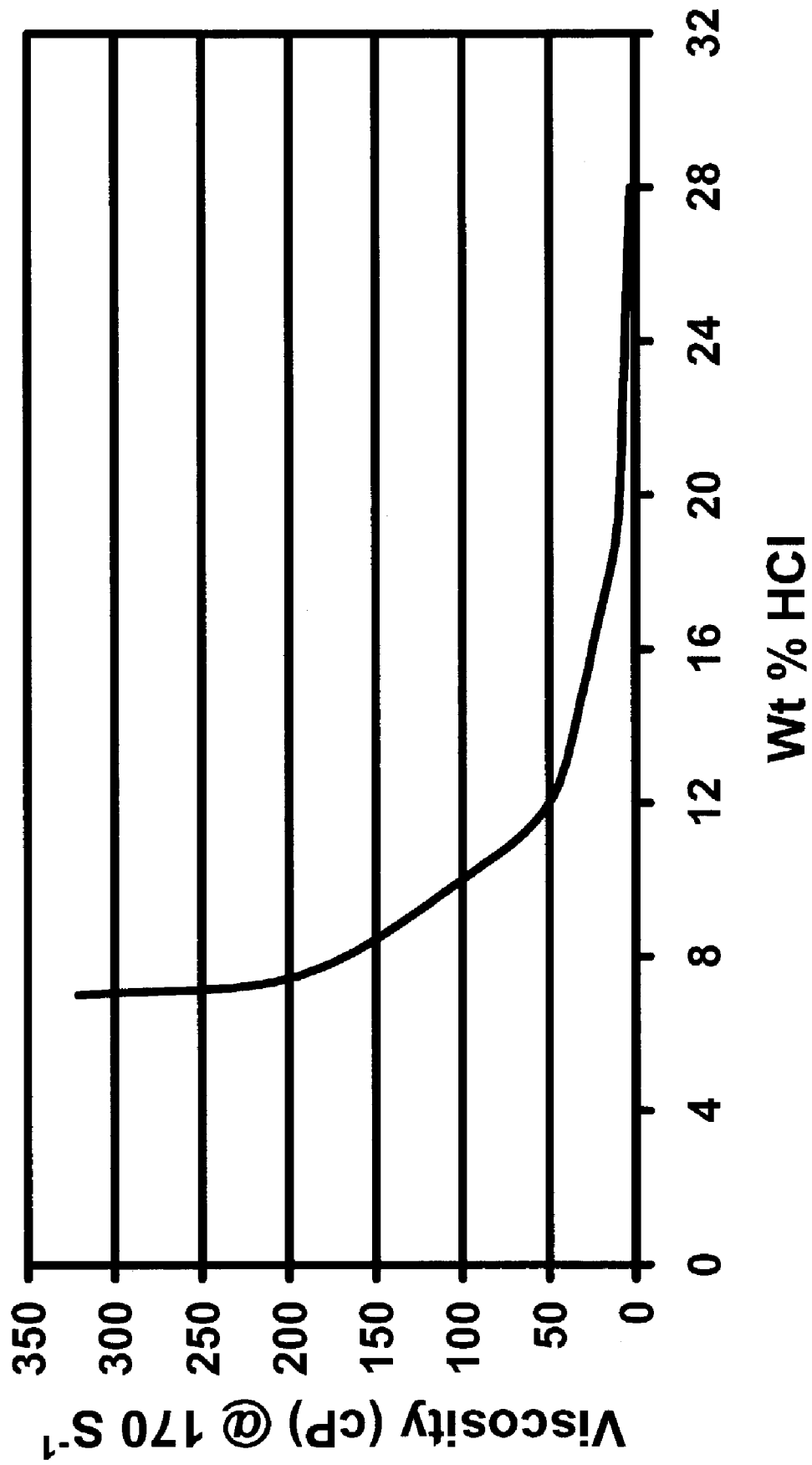
FIG. 1 shows the initial viscosity of aqueous fluids made with 7.5 weight % as-received BET-E-40 vs. weight % HCl concentration at about 23° C.

We have identified a fluid that is self-diverting and non-damaging when it is injected into sandstones. On reaction with the small amount of acid-soluble material found in sandstones, it forms a gel that is viscous enough and stable enough to divert mud-acid (or any other matrix stimulation fluid) and that then decomposes after the mud-acid treatment. By this (stable enough to divert mud-acid and then decomposing after the mud-acid treatment) we mean that the hydrolysis of the surfactant in the gel, once formed, at a given temperature and pH takes more than at least one hour longer than the mud acid treatment, as determined by reduction of the viscosity of the fluid to less than 50 cP at a shear rate of 100 sec$^{-1}$. This material is used as a pre-flush before a mud acid treatment, and is called here a "self-diverting pre-flush sandstone acid". Since it has a low viscosity as formulated and pumped, it preferentially enters the high-permeability zone or zones in the formation; these are generally the undamaged and high water-cut zones from which the operator wishes to exclude a main matrix stimulation fluid. Not only is it self-diverting, but it diverts subsequently-injected fluids such as an HCl pre-flush, the main mud-acid (or other matrix stimulation fluid) and any post-flushes. By diversion of a fluid we mean that more of the fluid enters the low permeability zone(s) than would be expected from a simple calculation based on the relative permeabilities of the different strata to the treatment fluid. Ideally, subsequently injected fluid is diverted from high permeability zones to low permeability zones; from undamaged zones or zones with little damage to highly damaged zones or zones having more damage; and from zones containing all or primarily water to zones containing all or primarily hydrocarbons. Preferably, the self-diverting pre-flush sandstone acid should be stable under downhole conditions for at least about 2 hours but should decompose within about 1 to 3 hours after shut-in at the completion of the job. The fluid contains water, a selected surfactant (such as BET-E-40 betaine), an inorganic acid, and a selected organic acid. It preferably contains a corrosion inhibitor, and optionally contains an alcohol such as methanol. Most importantly, it is strongly acidic, gels when only a small amount of the acid has been spent, is safe for use in easily-damaged sandstone formations, and cleans up readily.

It was known that sandstones typically may contain only small amounts of material that would react with acid, that is, would have the capability of reducing the acidity of an injected material by only a small amount. It was also known that the viscosity of certain viscoelastic surfactant gel-precursor fluid mixtures containing high amounts of inorganic acids would increase dramatically if substantial amounts of that acid were removed (for example by consumption in a reaction). It was also known that certain gelled surfactants could be decomposed for clean-up if the acidity was high enough. It has now been found that certain viscoelastic surfactant gel-precursor fluid mixtures containing intermediate amounts of inorganic acids increase dramatically in viscosity when the inorganic acid concentration is reduced by only a small amount. Consequently, if the proper amounts of the proper organic acids are incorporated in the mixture, the amount of inorganic acid can be kept low enough to be in the range where a small change will cause gellation while the total acidity of the mixture can be kept high enough to cause adequately rapid subsequent gel decomposition.

Figure 2:
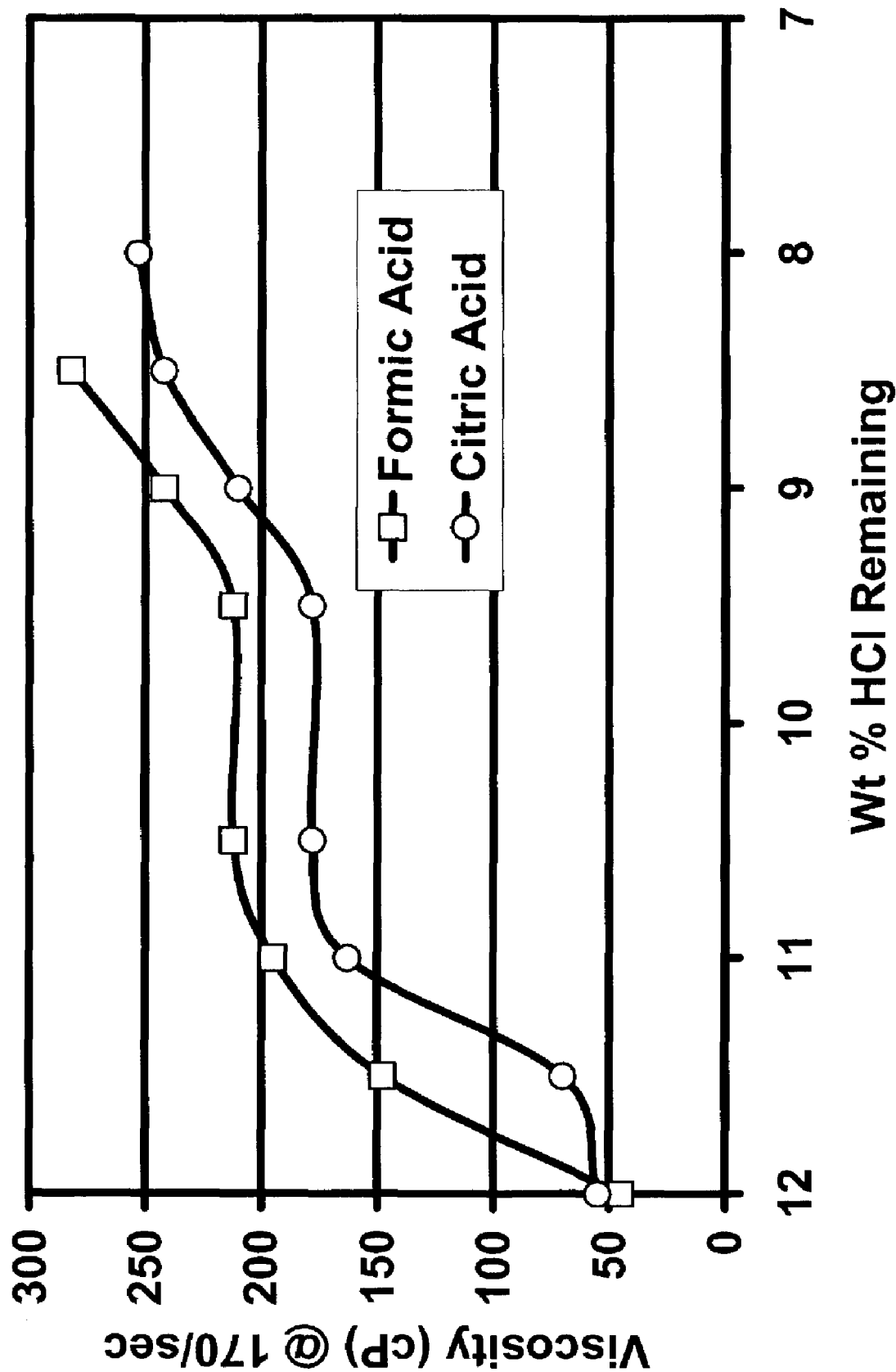
FIG. 2 shows the viscosity of fluids of Embodiments of the Present Invention as the acid concentration is decreased by reaction with carbonate.

It has been found that certain organic acids will keep the viscosity of these surfactant/inorganic acid/organic acid fluids low at inorganic acid concentrations at which the viscosity would otherwise be high. For example, FIG. 1 shows schematically the viscosity of viscoelastic fluids made with 7.5 weight percent as-received BET-E-40 and varying amounts of concentrated HCl. It can be seen that the viscosity is extremely low at HCl concentrations above about 20%; the viscosity then begins to increase gradually as the HCl concentration is reduced down to about 12%; the viscosity then rises more rapidly until the HCl concentration is reduced to about 10%; and the viscosity then rises rapidly and remains high at lower HCl concentrations. The exact shape of this curve would vary somewhat depending upon such factors as the choice of surfactant, and the presence and concentration of additives such as corrosion inhibitors. FIG. 2 shows the affect of the addition of 6 weight percent of either formic acid or citric acid to a fluid containing 7.5 weight percent as-received BET-E-40, 12 weight percent HCl, and no added salt. This figure shows experimental data on the viscosity of each of these two fluids as the HCl concentration is reduced by adding the appropriate amount of calcium carbonate to react with and consume some of the HCl. It can be seen that when these fluids contact even a small amount of carbonate, the viscosity immediately begins to rise. Again, the exact shape would be influenced by many factors, but for each fluid of Embodiments of the Present Invention there would be a point at which the reduction of the acid concentration would result in a dramatic increase in the viscosity. Other experiments have shown that these effects are governed substantially by the total acid concentration, and are not temperature-sensitive.

Many surfactants are known to form viscoelastic gels in aqueous solutions. Some require added salts and/or co-surfactants and/or alcohols for the gels to be sufficiently viscous and/or stable to be useful under oilfield treatment conditions. Such gels and their uses are described, for instance in U.S. Pat. Nos. 6,306,800; 6,035,936; 5,979,557 and others. Most viscoelastic gel systems are broken by disruption of the micelle structure; this occurs when the system is diluted, by water or especially by hydrocarbons. If the conditions of use are such that this does not occur, breakers for the surfactant molecule itself, such as oxidizers, are sometimes added. Such surfactants are well known. However, not all can be used in Embodiments of the Present Invention, because the surfactants and micelles of Embodiments of the Present Invention must be stable for a sufficient period of time in strong inorganic acid and then must be broken by that acid.

The surfactants useful in Embodiments of the Present Invention have cleavable chemical linkages, preferably but not limited to amide linkages, that are stabilized by nearby chemical functional groups. In particular, these surfactants have cationic or electron-withdrawing groups within about 3 atoms of the amide nitrogen. The first step in acid hydrolysis of amides is protonation of the amide functionality. The nearby electron-withdrawing group inhibits this protonation and greatly slows the acid hydrolysis, whereas other surfactants that do not have this aspect to their structure are either too stable or too unstable in strong acids to be useful. Thus the surfactants useful in Embodiments of the Present Invention can be cleaved, but not too easily. The choice of surfactant structure and of the nature and concentration of other components of the fluid can be adjusted so that the rate of surfactant cleavage under the conditions of use is suitable.

Certain zwitterionic surfactants have been found to be particularly useful in forming the aqueous self-diverting pre-flush sandstone acid. Preferred surfactants have the following amide structure:

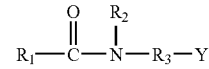

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine, a sulfonate, a carboxylic acid or an amine oxide.

Two particularly preferred examples are betaines called, respectively, BET-O and BET-E. One is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ tail group) and contains about 30% active surfactant; the remainder is substantially water, a small amount of sodium chloride, and isopropanol. An analogous material, BET-E-40, is also available from Rhodia and contains a erucic acid amide group (including a $C_{21}H_{41}$ tail group) and is 40% active ingredient, with the remainder again substantially water, a small amount of sodium chloride, and isopropanol. A generic betaine surfactant is shown below. These surfactants will be referred to as BET-O and BET-E (and generically as "BET surfactants"); in the examples, BET-O-30 and BET-E-40 were always used. The surfactants are supplied in this form, with an alcohol and a glycol, to aid in solubilizing the surfactant in water at these high concentrations, and to maintain it as a homogeneous fluid at low temperatures. However, the surfactants could be obtained and used in other forms. In field use, after dilution, the amounts of the other components of the as-received materials are not important. BET surfactants, and others, are described in U.S. Pat. No. 6,258,859. The generic structure is

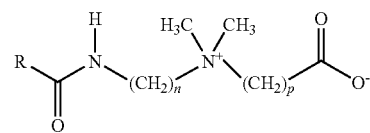

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably the surfactant is the betaine in which R is the straight-chained olefinic group $C_{17}H_{33}$ (BET-O-30) or the straight-chained olefinic group $C_{21}H_{41}$ (BET-E-40), and n=3 an p=1.

These betaine surfactants can form aqueous viscous high-temperature acid-degradable gels in any electrolyte concentration; they will form gels with no added salt or even in heavy brines. The fluids can generally be prepared, for example, with municipal water, lake or creek water, or seawater. Co-surfactants may be useful in extending the brine tolerance, and to increase the gel strength and to reduce the shear sensitivity of the fluid, especially for BET-O. An example of such a co-surfactant is sodium dodecylbenzene sulfonate (SDBS). For a given surfactant and conditions (especially the temperature and the time for which a suitable viscosity is required) the salinity and the presence and nature of co-surfactants can be adjusted to ensure that the gel will have the desired stability.

The inorganic acid can be any inorganic or inorganic acid except for hydrofluoric acid (which could cause the precipitation of undesirable solid fluorides). Thus the acid is, by non-limiting example, hydrochloric, sulfuric, or nitric acid. The rheology is affected primarily by the acid strength, not by the type of anion.

The organic acid is preferably formic acid, acetic acid, or citric acid. Other acids such as acetic acid, boric acid, lactic acid, methyl sulfonic acid and ethyl sulfonic acid may be used, although the gels formed using formic acid, acetic acid or citric acid are more stable. In sandstone matrix stimulation treatments, the choice of the acid used as a pre-flush to a main treatment depends on the absolute and relative silt and clay contents of the formation, its permeability, and the presence of HCl-sensitive minerals such as chlorite, glauconite and zeolites. These pre-flush acids commonly contain HCl and an organic acid. The organic acid replaces some of the HCl, because high HCl concentrations may damage formations by mobilizing fines and/or disaggregating sands. For operational simplicity, it is advantageous, although not required, to use the same organic acid/inorganic acid choice and combination in the self-diverting pre-flush sandstone acid as in the HCl pre-flush (that will actually follow the self-diverting pre-flush sandstone acid).

The alcohol is preferably methanol. Ethanol, propanol, isopropanol, ethylene glycol and propylene glycol may be used for low temperature applications. The purpose of the alcohol is to prevent the formation of sludge when the temperature is low and one of the decomposition products is a high-melting fatty acid such as a $C_{22}$ fatty acid that could be a solid. The amount of alcohol needed depends upon the temperature and the chemical structure of the hydrophobic tail of any fatty acids formed. For example, above about 93° C., typically only about 1% methanol is required to prevent sludge formation form BET-E.

The surfactant concentration in the aqueous self-diverting pre-flush sandstone acid is typically from about 1 to about 6 weight percent (active ingredient); preferred is from about 2 to about 4%; most preferred is about 3%. The amount of surfactant is chosen so that the fluid builds sufficient viscosity to act effectively as a diverter, but degradation of the surfactant will reduce that viscosity after the desired time. The inorganic acid concentration, for example HCl, is from about 6 to about 20 weight percent, preferably from about 6 to about 15%; most preferably about 12%. The organic acid concentration, for example formic acid, is from about 0 to about 20 weight percent, preferably from about 5 to about 10%; most preferably about 6%. The alcohol concentration, for example methanol, is from about 0 to about 10 weight percent, preferably from about 1 to about 6%; most preferably about 6%. The alcohol concentration is chosen to prevent sludge formation.

For sandstone formation stimulation, the preferred fluid is a hydrochloric/hydrofluoric acid ("mud acid") mixture, in which case the treatment is commonly called "matrix acidizing". The major drawbacks of mud acids are that they react too quickly and hence penetrate (as unspent acid) into the formation poorly and that they are highly corrosive to wellbore tubular components. Organic acids are a partial response to the limitations of inorganic acids. The principal benefit of the organic acids are lower corrosivity and lower reaction rate (which allows greater radial penetration of unspent acid). The organic acids used in conventional treatments are formic acid and acetic acid. Both of these acids when used alone have numerous shortcomings. First, they are far more expensive than inorganic acids. Second, while they have a lower reaction rate, they also have a much lower reactivity—in fact, they do not react to exhaustion of the starting materials, but rather remain in equilibrium with the formation rock. Hence one mole of HCl yields one mole of available acid (i.e., $H^+$), but one mole of acetic acid yields substantially less than one mole of available acid.

By "matrix acidizing" is meant the treatment of a reservoir formation with a stimulation fluid containing a reactive acid. In sandstone formations the acid reacts with soluble substances that were either present in the original formation matrix (especially materials cementing the sand grains together or loose between the sand grains, although some sand can also be dissolved) or were introduced (invaded the matrix) from the fluids used during drilling or completion. This cleans out or enlarges the pore spaces. The matrix acidizing treatment improves the formation permeability to enable enhanced production of reservoir fluids. Matrix acidizing operations are ideally performed at a high flow rate, but at treatment pressures below the fracture pressure of the formation. This enables the acid to penetrate the formation and extend the depth of treatment while avoiding damage to the reservoir formation.

By "sandstone" we mean a elastic sedimentary rock whose grains are predominantly sand-sized. The term is commonly used to imply consolidated sand or a rock made of predominantly quartz sand, although sandstones often contain feldspar, rock fragments, mica and numerous additional mineral grains, held together with silica or another type of cement. Sandstone formations usually contain small amounts of carbonates, commonly about 1 to 2% as a cement between sand grains. By "carbonate" we mean a material whose chief mineral constituents (typically 95% or more) are calcite (limestone) and aragonite (both $CaCO_3$) and dolomite [$CaMg(CO_3)_2$], a mineral that can replace calcite during the process of dolomitization. HCl essentially reacts only with carbonates; HF also reacts with silicates and silica.

It is recommended that the diversion be carried out so that the aqueous self-diverting pre-flush sandstone acid of Embodiments of the Present Invention penetrates to a radial distance of at least 10% of the depth of invasion of the mud acid treatment in order to obtain satisfactory diversion. However, deeper invasion is to be avoided so that the efficiency of the use of the aqueous self-diverting pre-flush sandstone acid is maximized and damage to the formation is minimized. In a properly designed treatment, after the aqueous self-diverting pre-flush sandstone acid injection, there will be a long plug of aqueous self-diverting pre-flush sandstone acid gel in the high permeability (and/or undamaged, and/or water-containing) zone(s) (that we will define as the "non-target" zone or zones for a matrix stimulation fluid) and a short aqueous self-diverting pre-flush sandstone acid gel plug in the low permeability (and/or damaged and/or oil-containing) zone(s) (that we will define as the "target" zone or zones for the matrix stimulation fluid). Note that by "plug" we do not mean that the formation becomes impermeable; rather we mean that the plug is a region of reduced permeability due to the presence of a viscous gel. The aqueous self-diverting pre-flush sandstone acid is designed not to decompose until after the injection of the matrix stimulation fluid (so that it can block entry of the matrix stimulation fluid into the non-target zone), so the low-viscosity matrix stimulation fluid must finger through the short plug of high-viscosity aqueous self-diverting pre-flush sandstone acid in order to treat the target zone. Thus, for success, there must be the right amount of aqueous self-diverting pre-flush sandstone acid injected and the right viscosity contrast between the aqueous self-diverting pre-flush sandstone acid and the matrix stimulation fluid.

Because sandstones inevitably contain at least small amounts of carbonates that contain calcium, when sandstone matrix stimulation treatments involve HF in order to dissolve silica, then some way must be devised to prevent the interaction of $Ca^{++}$ and $F^-$, or else $CaF_2$ will precipitate. This inevitably means injecting a sequence of different fluids.

The preferred sequence of injection of fluids in sandstone acidizing is an optional mutual solvent pre-flush, then an optional brine spacer, then the aqueous self-diverting pre-flush sandstone acid, then an optional HCl pre-flush (which will go into the zone to be stimulated), then an HCl/HF main acid fluid (mud acid) which will go into the zone to be stimulated, then a post flush. Any sandstone-dissolving acid may be used, that is mud acids having various concentrations and ratios of HCl and HF, acids in which HF is generated from a precursor rather than added directly, and acids containing chelating agents for aluminum such as polycarboxylic acids and aminopolycarboxylic acids. The mutual solvent pre-flush (such as about 10% ethylene glycol monobutyl ether in water) is used in oil wells to remove oil from the rock to be contacted with the aqueous self-diverting pre-flush sandstone acid; this is done to prevent contact of the surfactant with the oil, because the oil would act as a micelle breaker. If a mutual solvent is used, it is followed by a brine spacer (such as about 3 to about 5% ammonium chloride) to displace the mutual solvent from the rock to be contacted with the aqueous self-diverting pre-flush sandstone acid, because the mutual solvent would also act as a micelle breaker. It is common that the HCl or HCl/HF also includes an organic acid such as acetic acid or formic acid. Mutual solvent, such as 10% ethylene glycol monobutyl ether in water, is used as the post flush to strip any oil wetting surfactant from the surface and leave it water wet. In prior art conventional sandstone acidizing, the HCl pre-flush is commonly a 5 to 15% HCl solution containing a corrosion inhibitor. It displaces $Na^+$ and $K^+$ and dissolves calcite (calcium carbonate). This prevents subsequent precipitation of sodium or potassium fluosilicates or calcium fluoride when HF is introduced, and saves more-expensive HF. The aqueous self-diverting pre-flush sandstone acid of Embodiments of the Present Invention replaces some or all of the conventional HCl pre-flush. Usually, a conventional HCl pre-flush will still be used after the aqueous self-diverting pre-flush sandstone acid, because it is necessary to pre-flush the zone that will be stimulated. The post flush (for oil wells a hydrocarbon like diesel, or 15% HCl; for gas wells, acid or a gas like nitrogen or natural gas) also isolates the reacted HF from brine that may be used to flush the tubing, as well as restores a water-wet condition to the formation and to any precipitates that did form. If the post flush is a gas, any clean-up additives are put in the last HCl/HF stage. The sequence of stages may be repeated, for example sequentially treating sections of a formation penetrated by a borehole, for example at about 15 to about 25 feet at a time. The pre-flush and/or post flush also help to minimize any incompatibilities between chemical diverters, treatment fluids, and oil. Depending upon the fluid formulation, the duration of the treatment, and the temperature, after the last fluid is injected the well may be shut in for a short period of time sufficient for the decomposition of the surfactant in the aqueous self-diverting pre-flush sandstone acid before the well is turned around and fluid production is begun.

The inorganic acid concentration in the aqueous self-diverting pre-flush sandstone acid is selected based on the temperature, the times for which the gel should be stable and then the time after which it should degrade, the volume of aqueous self-diverting pre-flush sandstone acid fluid that will contact a given volume of rock, whether the rock contains inorganic acid-sensitive minerals (especially HCl-sensitive minerals) and the amount of acid with which a given volume of the rock will react. All but the last piece of information are determined from geologic information and the job design; the last can be determined by a simple laboratory experiment if a rock sample is available, or can be calculated if the rock composition is known. With this information the inorganic acid concentration can readily be determined so that the fluid has low viscosity when pumped, the reaction with the rock will lower the acid concentration sufficiently that the viscosity will increase significantly (for example by at least 50 cP), and that sufficient acid will remain in the gel to degrade the surfactant in a suitable time. The optimal inorganic acid concentration is, by non-limiting example, about 12% HCl.

The trend is that the higher the total acid concentration in the initial fluid, the lower its viscosity as formulated. This is desirable because lower-viscosity fluids are easier to inject and because there will be a greater viscosity contrast (and hence better diversion) between the as-pumped fluid and the higher viscosity achieved after some of the acid has been spent. However, on the one hand, for many HCl-sensitive formations, the HCl concentration should be kept as low as possible and extra acid needed should be provided with an organic acid, but on the other hand, if the formation is not HCl sensitive and contains a high amount of carbonate (so that the HCl content will be reduced a lot by spending), then a higher HCl concentration may be used, optionally with no organic acid at all. Another balance must be struck between the ability of the fluid to increase in viscosity at the appropriate time and place, and the subsequent tendency of the fluid to decompose. A formulation is most desirable if it works over a broad temperature range. The generation of the viscosity increase of the fluid of Embodiments of the Present Invention is not temperature-dependent but is dependent on the decrease in the total acid concentration; however, the fluid stability depends upon both the temperature and the acid concentration.

The aqueous self-diverting pre-flush sandstone acid of Embodiments of the Present Invention can also be used as a diverter for another form of matrix stimulation, sandstone treatment by chelating agents, a treatment analogous to sandstone acidizing. In sandstone treatment by chelating agents, fluids containing high concentrations of such chelating agents as, by non-limiting example, ethylenediaminetetraacetic acid, hydroxyethylethylenediaminetriacetic acid or hydroxyethyliminodiacetic acid or their various salts, or mixtures of these acids and/or their salts, are injected into a sandstone matrix to dissolve carbonate damage. These treatments can be performed over a very broad pH range, from about 2 to about 10. Commonly, the chelating agents or their salts are present in the treatment fluid at their upper solubility limit for the pH used. One preferred method of sandstone treatment by chelating agents is the use of such chelating agents in the presence of strong inorganic acids such as HCl. Sandstone treatment by chelating agents is to be distinguished from other oilfield stimulation treatments, such as fracturing or acidizing, in which much smaller amounts of these chelating agents may be present as stabilizers or metal control agents.

The fluids and methods of Embodiments of the Present Invention are used at temperatures above which the surfactant decomposes in strong acid in a time that is long enough to complete the mud acid matrix acidizing treatment but short enough to begin flowback and production within a reasonable time thereafter. For each surfactant/acid combination there is a temperature above which the gel will not remain sufficiently stable for sufficiently long for a mud acid matrix acidizing treatment to be performed. For each surfactant there is a temperature below which the decomposition is too slow for the treatment to be practical because even very high concentrations of inorganic acid would not destroy the surfactant in a short enough time. As examples, the surfactant BET-E-40 is stable to 15% HCl for over 34 hours at 27° C.; decomposes in 2 hours at 66° C. in 4% HCl; and decomposes in 1 hour at 88° C. in 7% HCl. A gelled fluid containing 7.5 weight percent as-received BET-E-40, about 7.5 weight percent HCl, 6 weight percent formic acid, and 2.6 weight percent of a mixture of corrosion inhibitors is stable for more than 100 minutes at 66° C. Of course, it should be understood that the acid concentration of a self-diverting pre-flush sandstone acid after it has been injected into a formation will be much less than the acid concentration of the initial fluid, because of the reaction of the acid with the formation. Therefore the decomposition of the surfactant in a formation (or in a core in an experiment in a laboratory) will be much slower. On the other hand, if the subsequently-injected matrix stimulation fluid is a strong acid, it will increase the decomposition rate of the surfactant where it fingers through the viscous gelled self-diverting pre-flush sandstone acid and fresh stimulation fluid contacts the gel. This will aid in the clean-up of the diverter, and since there is less diverter in the oil-containing and/or damaged and/or low permeability zone or zones, and more stimulation fluid being injected into that zone or zones, that zone or zones will clean up faster. Furthermore, in the zone or zones in which there is a shorter diverter plug, matrix stimulation fluid will break through more readily and contact the formation more effectively.

The compositions and methods of Embodiments of the Present Invention are particularly advantageous because no damage is caused to the subterranean formation or to the environment. It also does not require solids-handling surface equipment. Many materials used as diverting gents, such as inorganic salts, starch, and cross-linked polymers can cause damage by forming filter cakes on wellbore surfaces or by plugging the pores of the formation. This damage can be difficult or impossible to remove. Some components of diverting agents can be toxic to humans or to the environment. Even some diverting agents based on viscoelastic surfactants can be harmful. Some surfactants are toxic to some marine life; some surfactants can cause undesired wetability changes to mineral surfaces; and some surfactants can cause emulsions to form when water and oil mix in the formation or on the surface. However, the surfactants in the fluids of Embodiments of the Present Invention, when used as described, decompose into small non-toxic products that are not surfactants. They do not interfere with fluid flow in the formation or in surface equipment, provided that under certain circumstances an alcohol is included to prevent sludge formation as described above.

The compositions of Embodiments of the Present Invention are more environmentally friendly than compositions previously used, because injected fluids returned to the surface do not contain surfactants and the decomposition products do not include any materials that are not soluble in either water or oil. Furthermore, the decomposition products (for example the erucic acid and the amine formed by the hydrolysis of the surfactant of BET-E-40) are believed to be non-toxic to humans.

There are no restrictions on the order of addition of the components when the aqueous self-diverting pre-flush sandstone acids are being made up. The as-received surfactant mixture; water; inorganic acid; and organic acid; and optional materials such as alcohols; co-surfactants; chelating agents; and salt may be blended in any order either in the field or at a separate location. Alternatively, any combination of some of the components can be premixed on site or at a separate location and then another component or components may be added later. The fluids may be batch mixed or mixed on the fly. Standard mixing equipment and methods may be used; heating and special agitation are normally not necessary but may be used. Heating may be employed under extremely cold ambient conditions. The exact amounts of components and the specific surfactant or mixture of surfactants to be used will depend upon the viscosity desired, the temperature of use, the time desired before the viscosity has dropped below a predetermined value, and other similar factors.

As is usually the rule for acid treatments, the formulation will typically comprise corrosion inhibitors, most preferably small amounts of corrosion inhibitors based on quaternary amines, for example at a concentration of from about 0.2 weight percent to about 1.5%, preferably about 0.4 to about 1.0%, and most preferably from about 0.2% to about 0.6%. Formic acid can also be used as a corrosion inhibitor, typically at a concentration of from about 0.1 to about 2.0 weight percent. All other additives normally used in oilfield treatment fluids, such as, but not limited to, corrosion inhibitor aids; scale inhibitors; biocides; leak-off control agents; shale stabilizing agents such as ammonium chloride, tetramethyl ammonium chloride, or cationic polymers; monovalent and polyvalent salts and polyelectrolytes; other surfactants; buffers; non-emulsifiers; freezing point depressants; iron reducing agents; chelating agents for the control of certain multivalent cations, and others can also be included in the aqueous self-diverting pre-flush sandstone acids as needed, provided that none of them disrupts the structure, stability, or subsequent degradability of the surfactant gels. Similarly, other fluids used in conjunction with the fluid of Embodiments of the Present Invention, such as spacers, flushes, and the like may contain such additives, again provided that they do not interfere with the function of the aqueous self-diverting pre-flush sandstone acid. It would be expected, and within the scope of Embodiments of the Present Invention, to conduct laboratory tests or run computer simulations to ensure that all additives are suitable.

It should be noted that, although no tests have been run, the formulation of Embodiments of the Present Invention is expected to be sensitive to iron, in particular to ferric ions at a concentration of about 2000 ppm (parts per million) or more. A preflush treatment with iron reducing agent and chelating agent is therefore recommended before the acid treatment. Although the formulations of Embodiments of the Present Invention are compatible with small concentrations of non-emulsifying agents, to prevent emulsions and sludge, it is also a good practice to preflush the well with a mutual solvent, preferably low molecular weight esters, ethers or alcohols, and more preferably ethylene glycol monobutyl ether.

Most importantly, unlike many other viscoelastic surfactant-based gels, the formulations of Embodiments of the Present Invention do not require oil, formation water or mutual solvent to flow back from the formation for the gel to break, because the inorganic acid acts as a breaker. Therefore breaking of the gel in the low permeability zone(s) will occur at the same rate as breaking of the gel in the high permeability zone(s). Breaking of the gel by dilution is a much less efficient process than destruction of the surfactant by acid, so flow of formation water into the gel in the high permeability zone(s) zone could delay breaking of the surfactant in the water zone by the acid (by diluting the acid) and thus prolong rather than reduce the diverting action. Although the formulations of Embodiments of the Present Invention do not require added breakers for the micelles or for the surfactants, additional breakers may be added, especially at low temperatures.

The system is adjusted so that the break time is greater than the mud acid pump time. The break time will be a function of the choice of surfactant and its concentration; the temperature; the choice of acid and its concentration; the ionic concentration and the nature of both the anions and cations, including ionized forms of other additives such as chelating agents, if present; and the nature and amount of alcohol present. However, for each given surfactant type the stabilities are expected to be about the same (for example for BET-O vs. BET-E as a function of time, temperature and acid concentration) because they have the same electron withdrawing group in the degradable chemical functionality. (The distance between the electron withdrawing group and the bond that is broken would make a difference.) Surfactants having different electron withdrawing groups will give different ranges of stabilities. Variation in the amount of acid acting as surfactant breaker can be used to control the time at which the gel breaks at a given temperature. There will be a certain range of acid concentrations remaining after the aqueous self-diverting pre-flush sandstone acids have reacted with the carbonate in the sandstone and formed a diverting gel, for example from about 4% up to about 7%, for BET-E, at which the gel strength will be about the same at a given temperature, but the time to break will decrease with increasing acid concentration.

The fluids can be foamed or energized if desired, for example with nitrogen, carbon dioxide, or mixtures of the two. BET surfactants themselves are foam formers, but additional foaming agents may be added provided that they do not interfere with the function of the aqueous self-diverting pre-flush sandstone acid. Other important uses for these fluids include as fluid loss pills, kill pills or for temporary selective water shutoff. Viscosities of at least about 30 to about 50 cP measured at a shear rate of 100 sec$^{-1}$ are preferred for these uses. Although the uses are described in terms of producing wells for oil and/or gas, the fluids and methods may also be used for injection wells (such as for enhanced recovery or for storage or disposal) or for production wells for other fluids such as carbon dioxide or water.

EXAMPLE 1

Experiments were performed in which fluids were pumped into cores of Berea sandstone and the permeabilities to water were determined before and after the treatments. The cores, which were 1 inch (2.54 cm) in diameter and 12 inch (30.5 cm) in length, were heated to the desired temperature through external heating tape in two Hassler cells. Data from the first set of experiments are shown in Table 1. The self-diverting pre-flush sandstone acid (SDSA) in each case was an aqueous solution of 7.5% as-received BET-E-40, 12% concentrated HCl, 6% formic acid, 1% methanol, 2% Corrosion Inhibitor "A" (85% formic acid in water) and 0.6% Corrosion Inhibitor "B" (an additive package containing corrosion inhibitors based on quaternary amines). This fluid will be called SDSA-1. The "matrix stimulation fluid" (MSF) in each case was an aqueous solution of 15% concentrated HCl, 6% methanol, and 0.6% Corrosion Inhibitor B, except for Experiment 4, in which there was no methanol in the MSF. (The HF was left out of this "matrix stimulation fluid" to avoid experimental complexities.) The fluid with 6% methanol will be called MSF-1. Each fluid was injected at 2.5 ml/min. Shut-in was at temperature with the MSF in the core.

TABLE 1

Single Core Experiments

| Experiments | 1 | 2 | 3 | 4 | 5 |
|---|---|---|---|---|---|
| Temperature (° C.) | 93 | 93 | 93 | 121 | 121 |
| Initial Permeability (mD) | 64 | 65 | 56 | 140 | 64 |
| Core Pore Colume (ml) | 26 | 28 | 28 | 29 | 28 |
| Pore Volumes SDSA-1 Injected | 1.7 | 1.6 | 1.6 | 1.7 | 2.3 |
| Pore Volumes MSF-1 Injected | 3.2 | 2.8 | 2.8 | 1.7 | 2.5 |
| Shut-in Time (hr) | 1 | 2 | 3 | 4 | 12 |
| Regained Permeability (%) | 31 | 42 | 97 | 45 | 137 |

The trend seen in tests 1-3 was due to hydrolysis of the surfactant; the longer the shut-in time, the more surfactant hydrolysis, the better clean-up, and therefore the more regained permeability. In Experiment 4, not to be limited by theory it is believed that insufficient MSF was injected, so the system probably did not maintain a great enough acid concentration for sufficient hydrolysis. In Experiment 5, not to be limited by theory it is believed that the better result was due both to more hydrolysis and to more stimulation (greater $CaCO_3$ dissolution) resulting from the longer shut-in time and from the greater amount of MSF relative to Experiment 4. These results show the importance of designing a job to achieve all three of diversion, stimulation and clean-up.

Figure 3:
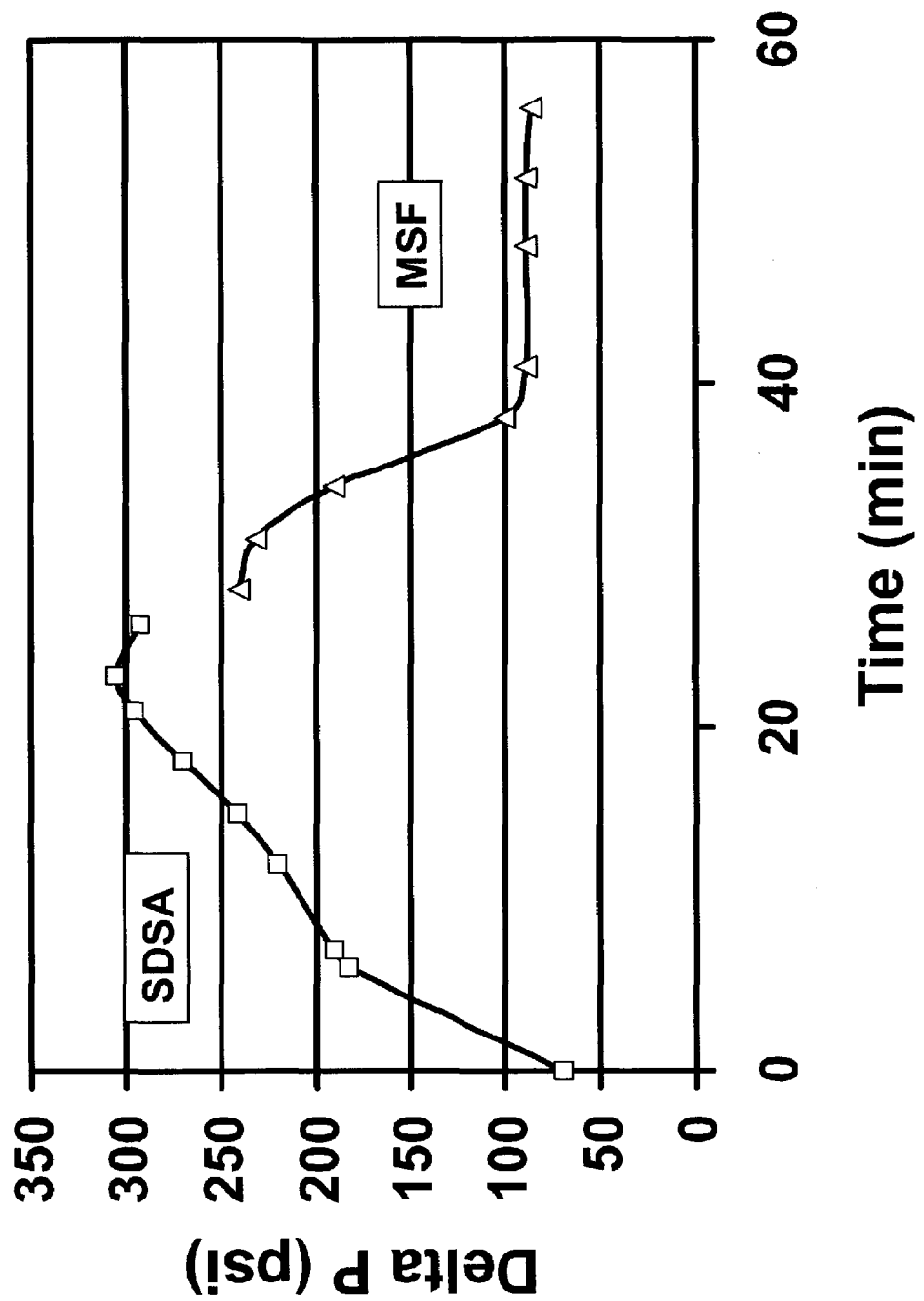
FIG. 3 shows the pressure drops across a core during injection of an aqueous self-diverting pre-flush sandstone acid and then a matrix stimulation fluid.

FIG. 3 shows the pressure drop across the core during fluid injection during Experiment 5. It can be seen that, during injection of the self-diverting pre-flush sandstone acid, the pressure drop across the core increased steadily, as the gel viscosity increased inside the core due to consumption of HCl by carbonate dissolution. When the low-viscosity matrix stimulation fluid was introduced, the pressure drop remained high, indicating great resistance to flow of this fluid. Not to be limited by theory, but it is believed that in an underground formation, the fluid would be diverted into a different zone; in this case, where there is no such alternative, the low-viscosity fluid fingered through the diverter. It apparently broke through at about 40 minutes after which the pressure drop remained quite significant and constant, indicating that there was still diverter in the core pores. The pressure drop during the water-permeability measurement at the start of the experiment had been 14 psi (0.097 MPa). In fact, it is this fingering (due to viscosity contrast) that contributes to the success of the method of Embodiments of the Present Invention. In a properly designed treatment, after the SDSA injection, there will be a long plug of SDSA gel in the high permeability (and/or undamaged, and/or water-containing) zone and a short SDSA gel plug in the low permeability (and/or damaged and/or oil-containing) zone. The SDSA is designed not to decompose until after the injection of the MSF (so that it can block entry of the MSF into the non-target zone), so the low-viscosity MSF must finger through the high-viscosity SDSA in order to treat the target zone.

EXAMPLE 2

Many dual-core experiments were performed, in which the same methods were used as in example 1, except that the fluid was injected through a splitter so that it had equal access to each of the two cores. Fluids were pumped into the two cores at a constant total flow rate. However, the flow rate into each core was dependent upon the relative permeabilities of the cores, the changes in fluid viscosity in the cores during the experiments (as gel plugs of different lengths built up), and clean-up as the gel plugs were destroyed. The amount of fluid entering each core (and the pressure drop across the core) was measured. Basic data from each experiment are shown in Table 2.

initially the aqueous injected fluid would go into the water-containing core, but in time a plug of high-viscosity gel was forming in the water-containing core. Injection of the SDSA was stopped in Experiment 7 at just about the time at which equal amounts of SDSA were entering each core. When the injected fluid was switched to a MSF in that experiment, most

TABLE 2

Dual Core Experiments

| Experiment Number | 6 | 7 | 8 | 9 | 10 | 11 | 12 | 13 | 14 | 15 |
|---|---|---|---|---|---|---|---|---|---|---|
| Temperature ° C. | 93 | 93 | 66 | 66 | 66 | 66 | 93 | 121 | 121 | 149 |
| Core 1 mD | 67 | 88 | 27 | 29 | 79 | 131 | 39 | 73 | 63 | 19 |
| Core 2 mD | 94 | 76 | 67 | 254 | 201 | 266 | 97 | 166 | 178 | 42 |
| Fluid in Core 2 | diesel | diesel | water | water | * | water | water | water | water | water |
| SDSA | 1 | 1 | 2 | 2 | 2 | 1 | 1 | 1 | 1 | 1 |
| SDSA Pore Volumes | 1.1 | 0.7 | 1 | 1 | 1.4 | 1.3 | 1.3 | 1.2 | 1.3 | 1.1 |
| MSF | 1 | 1 | 2 | 3 | 4 | 5 | 1 | 1 | 1 | 1 |
| MSF Pore Volumes | 0.8 | 0.7 | 0.7 | 0.7 | 2.9 | 2.1 | 1.2 | 1.0 | 1.1 | 1.3 |
| Shut-in (hr) | 12 | — | 12 | 12 | 4 | 12 | 12 | 12 | — | 0 |
| Regained Perm Core 1, % | 84 | — | 76 | 108 | 102 | 23 | 81 | 72 | — | 108 |
| Regained Perm Core 2, % | 16 | — | 17 | 50 | 104 | 1 | 47 | 14 | — | 35 |
| FIG. Number | 4 | 5 | 6 | 7 | — | 8 | 9 | 10 | 11 | 12 |

*Both cores injected with over two pore volumes of a fluid consisting of 12% HCl; 6% formic acid; 2% A; 0.6% B; and 6% methanol before injection of the SDSA.

SDSA-1: 12% HCl; 6% formic acid; 2% A; 0.6% B; 1% methanol; 7.5% BET-E-40
SDSA-2: 12% HCl; 6% formic acid; 2% A; 0.6% B; 6% methanol; 7.5% BET-E-40
MSF-1: 15% HCl; 0.6% B; 6% methanol
MSF-2: 3 % $NH_4Cl$.
MSF-3: 12% HCl; 0.6% B; 6% methanol
MSF-4: 12% HCl; 2% A; 0.6% B; 6% methanol; 6% formic acid
MSF-5: 12% HCl; 3% HF The results of these experiments are shown in FIGS. 4-12. In these figures, the instantaneous weight percent of the fluid being injected that was going into each core is shown as a function of time. Each figure shows the injection of the SDSA, followed by a brief delay of a few minutes while the fluid being injected was changed, followed by injection of the MSF. For example, in Experiment 6 (FIG. 4), SDSA-1 was injected for the first 25 minutes, then after a fluid-changing time of about 2 minutes, MSF-1 was injected for about 18 minutes. Initially, almost 80% of the SDSA-1 went into the water-containing core; after about 11 minutes, equal amounts of DSDS-1 were entering each core; at the end of the diverter injection, 60% of the fluid was entering the oil-containing core. At the start of the MSF injection, almost 80% of the fluid was going into the water-containing core, and as injection of MSF continued, the amount of fluid going into the water-containing core increased.

Figure 4:
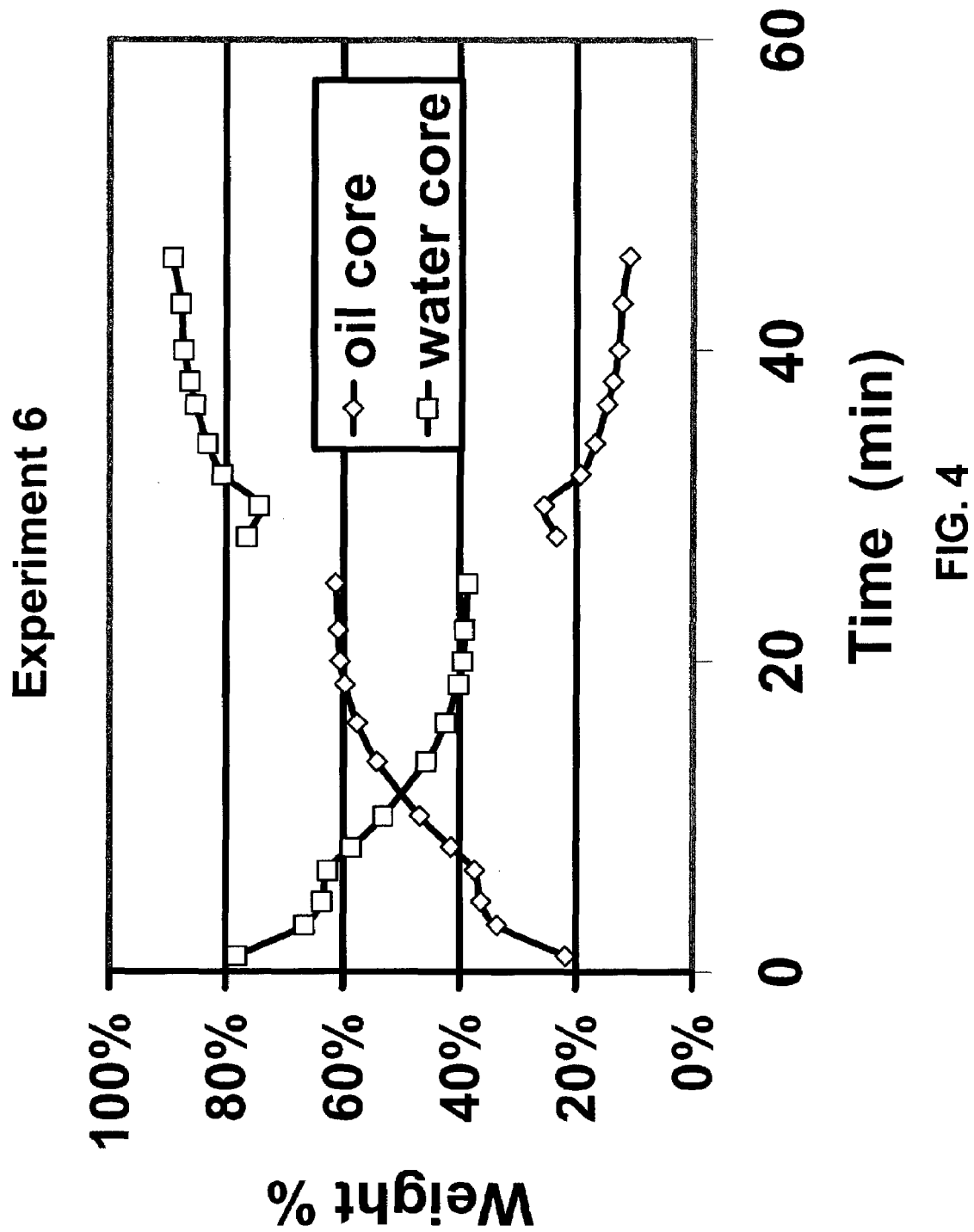
FIG. 4 shows the weight percent of an aqueous self-diverting pre-flush sandstone acid, and then of a matrix stimulation fluid, entering each core in a dual-core experiment in which one core is saturated with oil.
Figure 5:
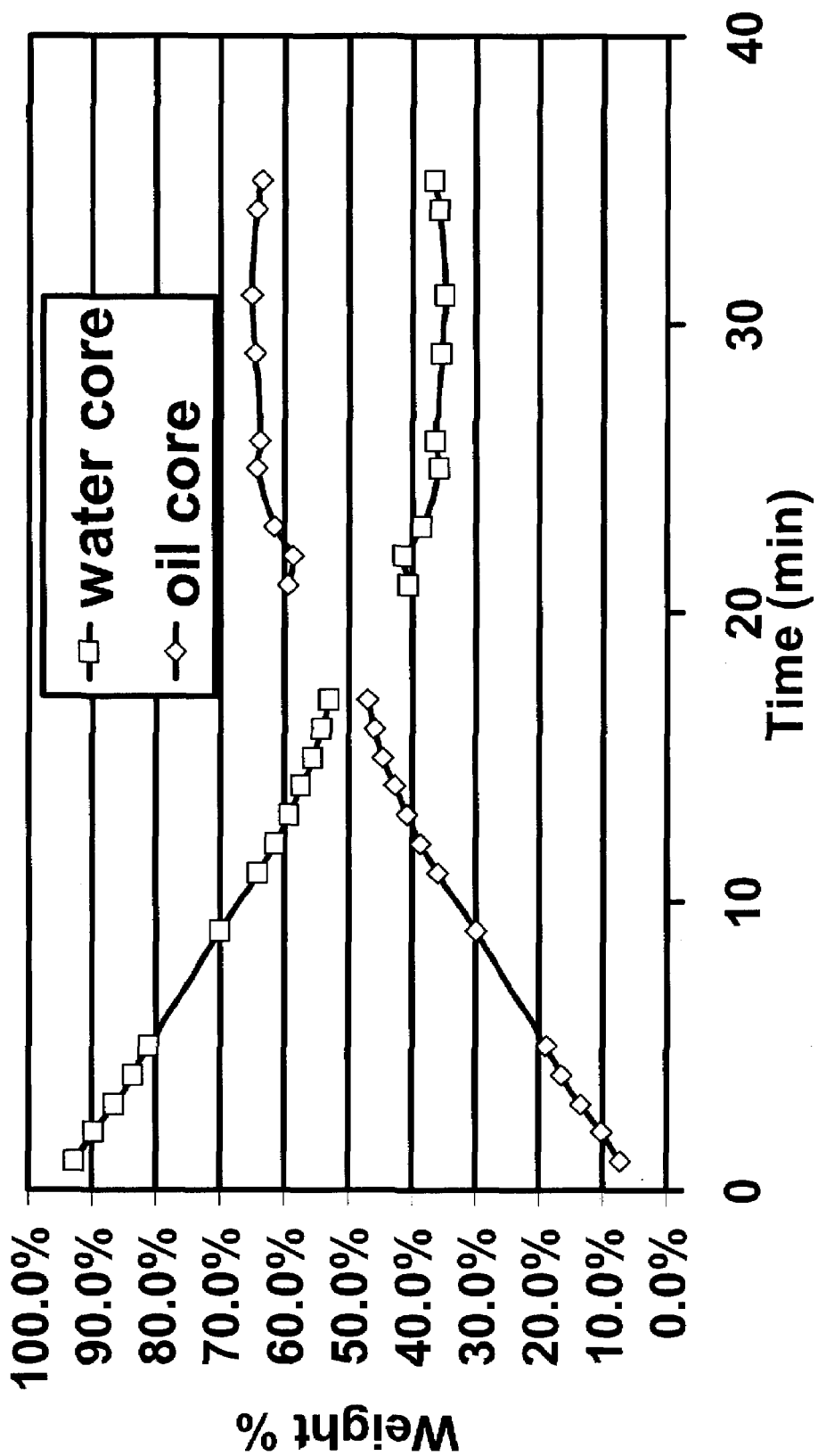
FIG. 5 shows the weight percent of an aqueous self-diverting pre-flush sandstone acid, and then of a matrix stimulation fluid, entering each core in a dual-core experiment in which one core is saturated with oil.
Figure 6:
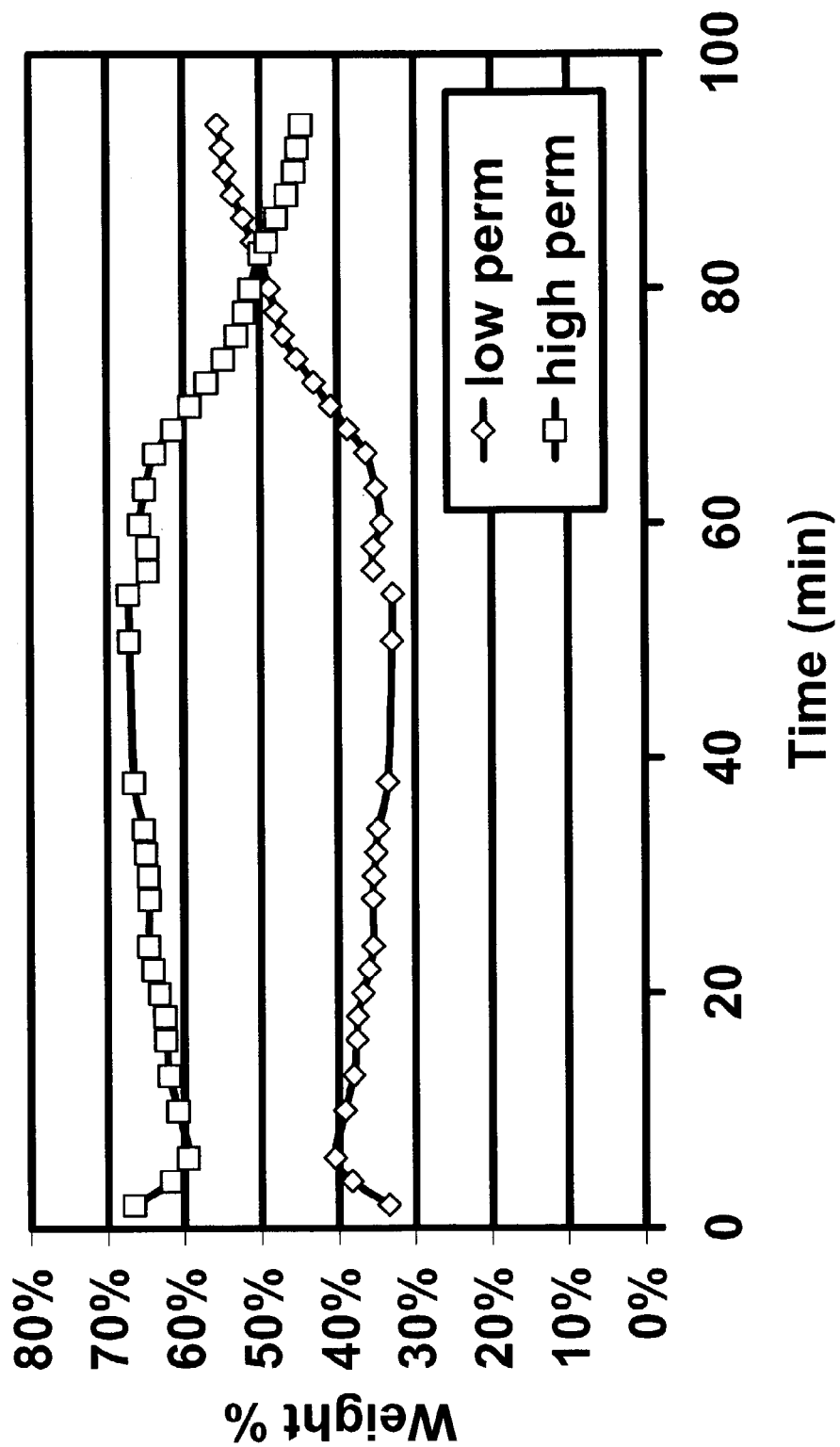
FIG. 6 shows the weight percent of an aqueous self-diverting pre-flush sandstone acid, and then of a matrix stimulation fluid, entering each core in a dual-core experiment in which the cores have different perm abilities.
Figure 7:
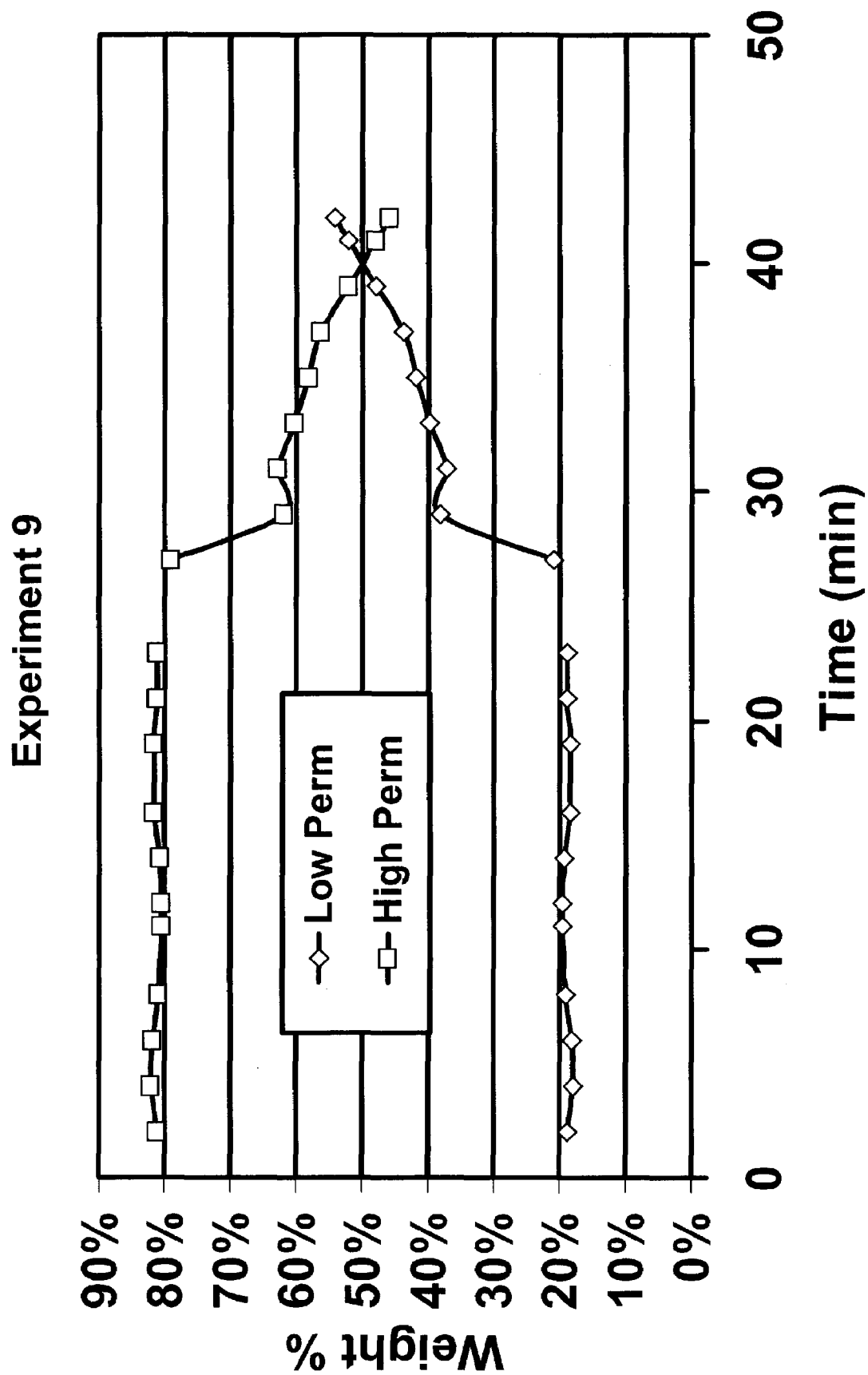
FIG. 7 shows the weight percent of an aqueous self-diverting pre-flush sandstone acid, and then of a matrix stimulation fluid, entering each core in a dual-core experiment in which the cores have different permeabilities.
Figure 8:
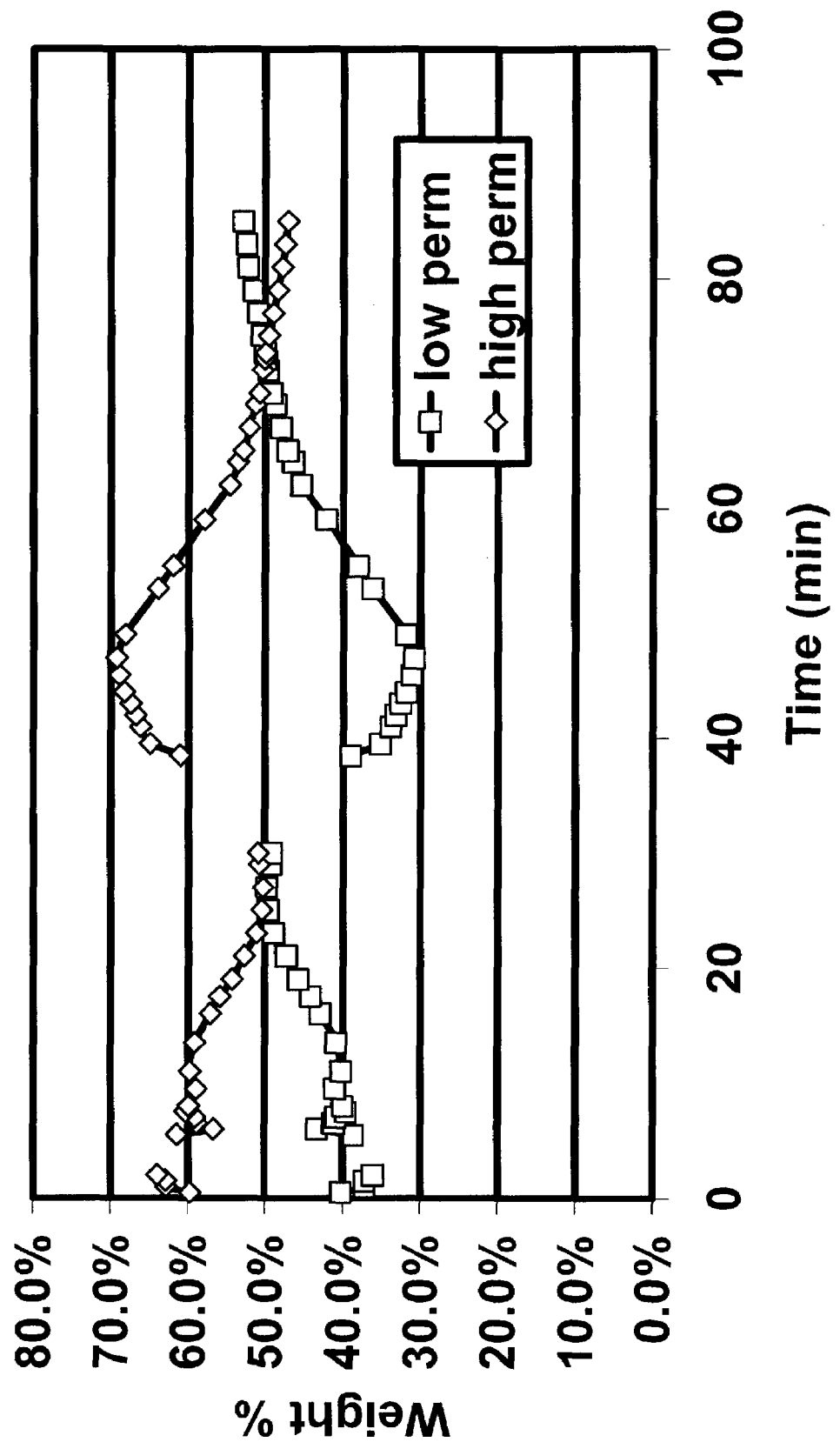
FIG. 8 shows the weight percent of an aqueous self-diverting pre-flush sandstone acid, and then of a matrix stimulation fluid, entering each core in a dual-core experiment in which the cores have different permeabilities.
Figure 9:
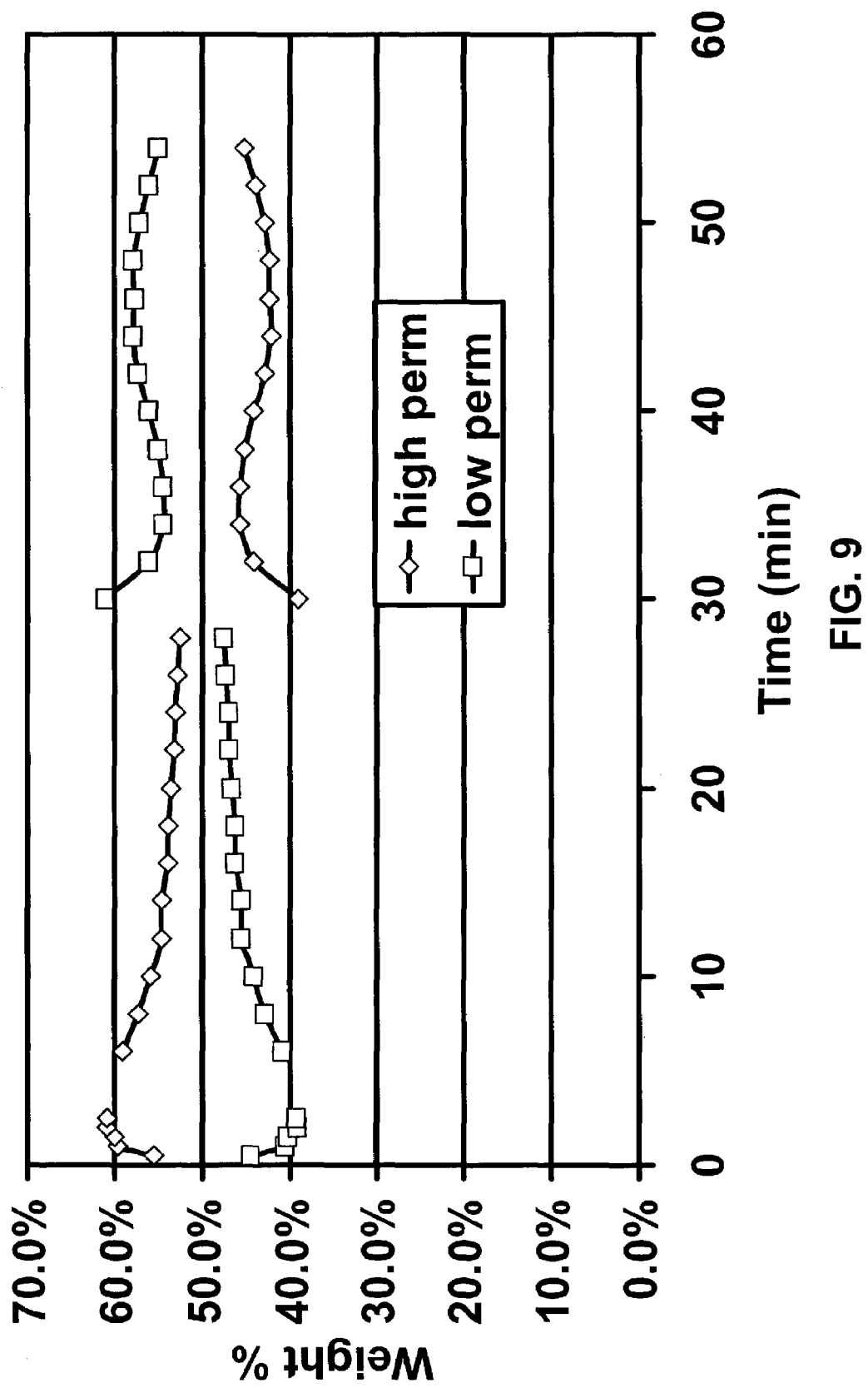
FIG. 9 shows the weight percent of an aqueous self-diverting pre-flush sandstone acid, and then of a matrix stimulation fluid, entering each core in a dual-core experiment in which the cores have different permeabilities.
Figure 10:
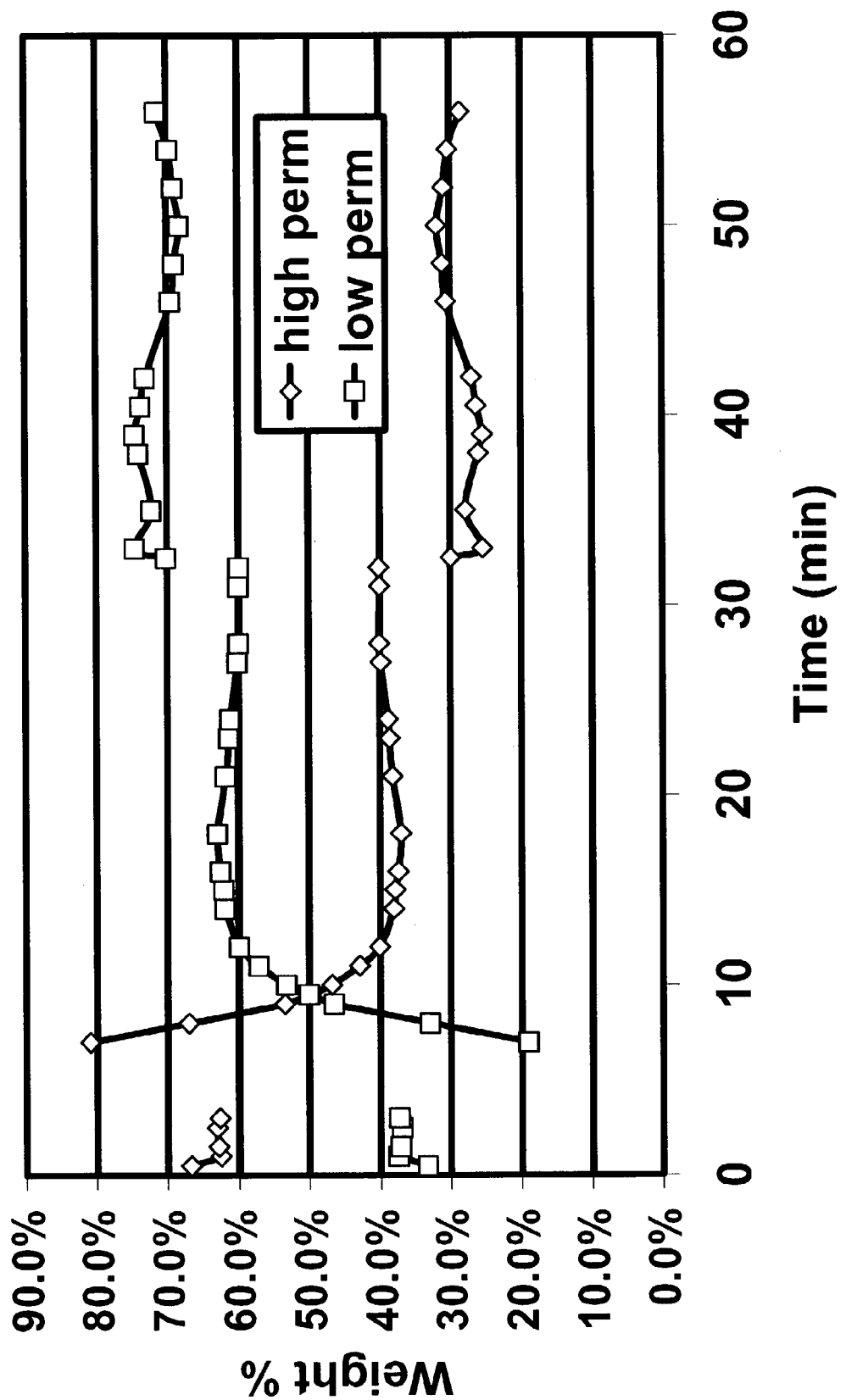
FIG. 10 shows the weight percent of an aqueous self-diverting pre-flush sandstone acid, and then of a matrix stimulation fluid, entering each core in a dual-core experiment in which the cores have different permeabilities.
Figure 11:
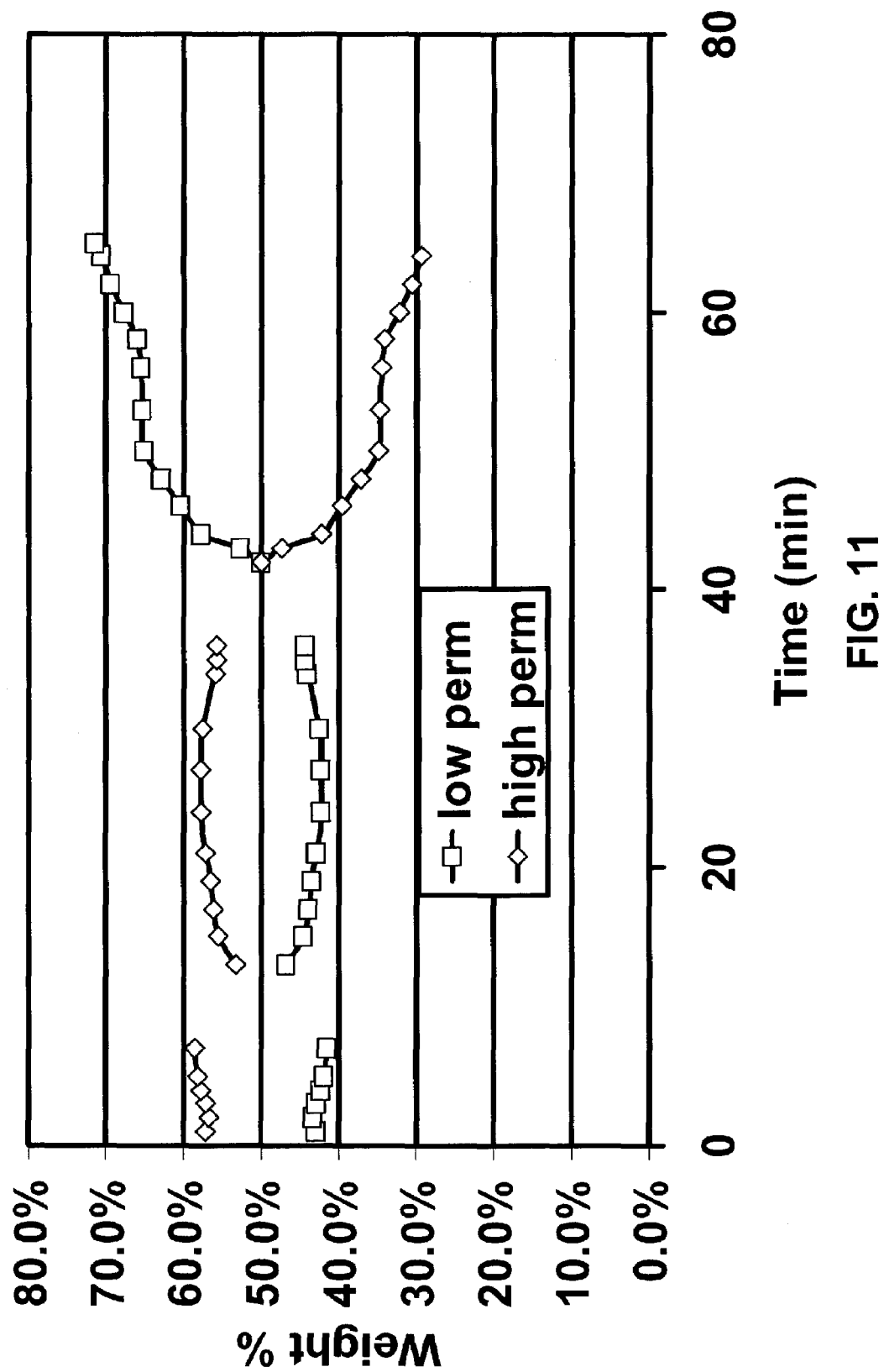
FIG. 11 shows the weight percent of an aqueous self-diverting pre-flush sandstone acid, and then of a matrix stimulation fluid, entering each core in a dual-core experiment in which the cores have different permeabilities.
Figure 12:
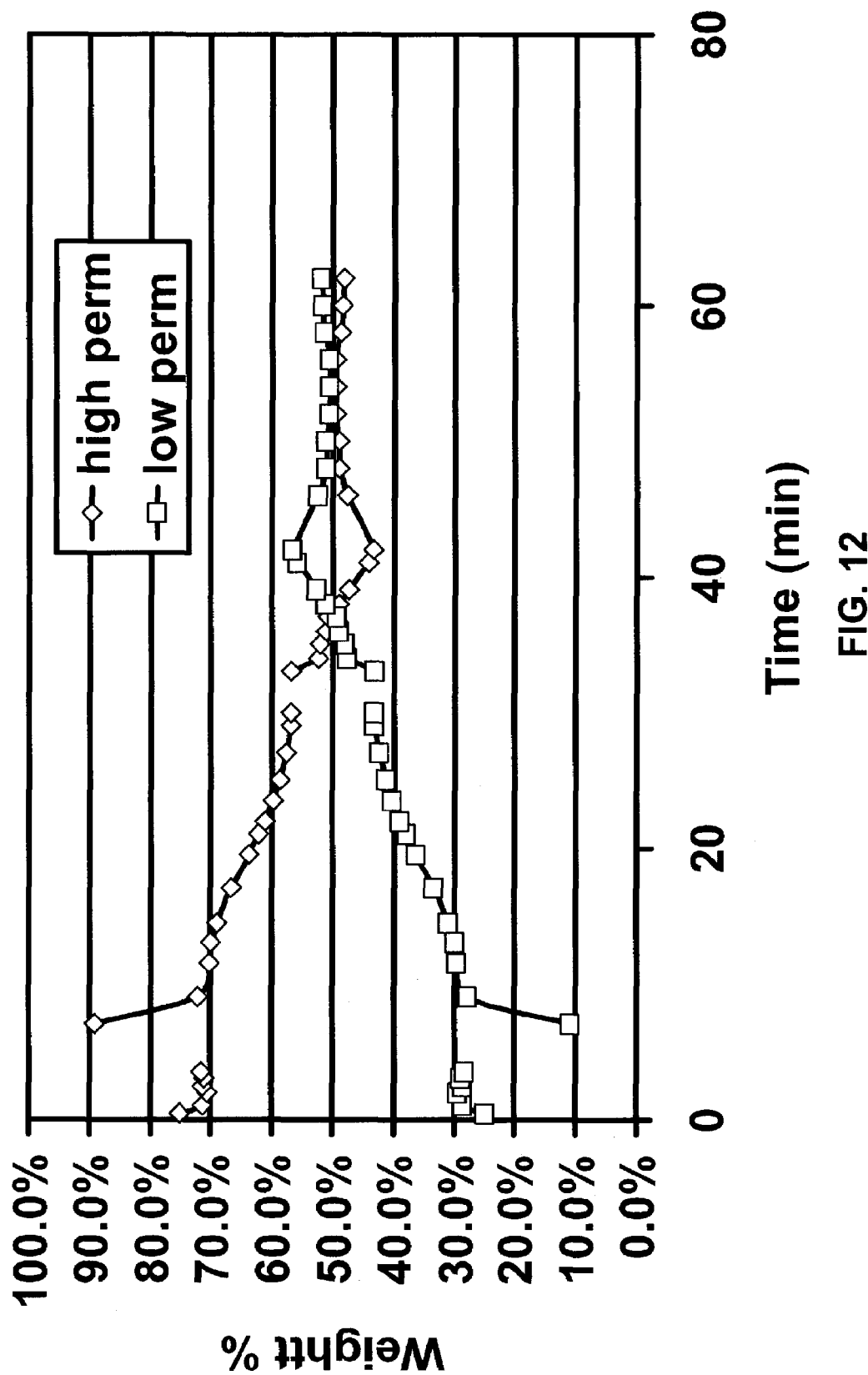
FIG. 12 shows the weight percent of an aqueous self-diverting pre-flush sandstone acid, and then of a matrix stimulation fluid, entering each core in a dual-core experiment in which the cores have different permeabilities.

FIGS. 4 and 5 show two experiments (6 and 7) in which in each case one core was first injected with over one pore volume of diesel after the initial permeabilities were measured with water. Therefore, at the start of the diversion experiments, one core contained diesel as the continuous phase and was at low water saturation; the other core contained only water. In each of these experiments, the initial permeabilities of the two cores were about the same. It can be seen that in each case, initially 80-90% of the SDSA went into the water-containing core, but as injection continued, more and more of the SDSA went into the oil-containing core. Not to be limited by theory, but it is believed that this was because of the MSF went into the oil-containing core, which is exactly what would be desired for proper diversion in the field. However, in Experiment 6, the SDSA injection was continued well beyond the point at which equal amounts of SDSA were entering each core; although it is not shown, the pressure in both cores had become very high as the pumping had been continued. In this case, when the injected fluid was switched to a MSF, most of the MSF went into the water-containing core. Although not to be limited by theory, it is believed that too much diverter had been injected into the oil-containing core, so that when the aqueous MSF was started, it preferably entered the water-containing core. These results demonstrate that the right amount of SDSA must be selected and too much could be used if the job was not properly designed.

Experiments 8 and 9 (FIGS. 6 and 7) are excellent examples of successful treatments. In each case, the cores were saturated with brine, then about one pore volume of a SDSA was injected, then MSF was injected. In Experiment 8, the "MSF" was $NH_4Cl$; in Experiment 9, it was mainly HCl. In each case, the SDSA primarily entered the high-permeability core, as would be expected. However, not to be limited by theory, but since in each experiment the total amount of SDSA injected was equal to the total pore volume of both cores, and about twice as much fluid entered the high-permeability core as entered the low-permeability core in Experiment 8 and about four times as much fluid entered the high-permeability core as entered the low-permeability core in Experiment 9, it is believed that in each case, the high-permeability core was filled with a viscous SDSA gel while the low-permeability core contained some gel only at the front end. Then, when MSF was injected, it initially went into the high-permeability core, but with time it fingered through the smaller amount of gel in the low-permeability core, and eventually more MSF was entering the low-permeability core, which is exactly what would be needed for successful diversion. The systems were then shut in at temperature for 12 hours and the permeabilities of each core were re-measured with water. The initially low-permeability core in each case recovered a much greater fraction of its permeability than did the initially high-permeability core. In fact, the low-permeability core, which is believed to have been filled with acid when it was shut in for 12 hours (even though the acid was HCl and did not contain HF), was more permeable after the experiment than before the experiment. This is probably due to dissolution of at least some of the carbonate in the core. This did not happen when the "MSF" contained no acid.

Experiment 10 (no FIG.) shows that the sandstone must have some ability to consume acid in the SDSA. In that experiment, the cores were flooded with over two pore volumes of 12% HCl before the injection of the SDSA. This is believed to have consumed all of the carbonate. The SDSA did not cause any diversion. When the MSF was started, more of it went into the high-permeability core, and as MSF injection continued, more and more of it went into the high permeability core. By the end of the experiment, a slightly greater proportion of the MSF was entering the high-permeability core than would have been expected from the initial permeabilities. After the experiment, each core had a permeability to water slightly above the permeability before the experiment.

Experiments 11-15 (FIGS. 8-12) all show core floods that demonstrate successful diversion by the SDSA. (Each of these figures shows, in the first few minutes, injection of a total of less than about 0.2 pore volumes of brine used to determine the initial permeability.) These experiments show a variety of temperatures, permeabilities, permeability contrasts, and shut-in times. In each case, the majority of the SDSA initially was entering the high-permeability core, but the majority of the MSF was eventually entering the low-permeability core and the regained permeability of the low-permeability core after the experiment was greater because of more effective clean-up and more effective stimulation.

Although the methods have been described here for, and are most typically used for, hydrocarbon production, they may also be used in injection wells and for production of other fluids, such as water or brine.

I claim:

1. A self-diverting pre-flush sandstone acid treatment composition comprising
water,
an acid-hydrolyzable surfactant capable of forming a viscoelastic gel, the surfactant having the following amide structure:

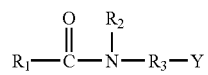

wherein $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 10 carbon atoms; and Y is an electron withdrawing group rendering the amide group difficult to hydrolyze;
an inorganic acid in an amount from about 6 to about 20 weight percent, and
an organic acid in an amount from about 5 to about 20 weight percent,
wherein said self-diverting composition increases in viscosity of at least about 50 cP at 170 sec$^{-1}$ upon neutralization of less than about one third of the total acid, and hydrolysis of the surfactant in the gel, once formed, at a given temperature and pH takes more than at least one hour longer than the acid treatment, as determined by reduction of the viscosity of the fluid to less than 50 cP at a shear rate of 100 sec$^{-1}$.

2. The composition of claim 1 wherein Y comprises a functional group selected from the group consisting of a quaternary amine, an amine oxide, a sulfonate and a carboxylic acid.

3. The composition of claim 2 wherein the surfactant is a betaine having the structure:

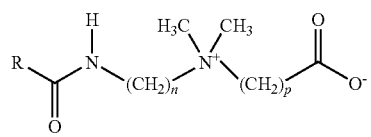

wherein R is a hydrocarbyl group that may be branched or straight chained, aromatic, aliphatic or olefinic and has from about 14 to about 26 carbon atoms and may contain an amine; n=about 2 to about 10; and p=1 to about 5, and mixtures of these compounds.

4. The composition of claim 3 wherein the surfactant is a betaine in which R is an alkene side chain having from about 17 to about 22 carbon atoms, n=about 3 to about 5, and p=1 to about 3, and mixtures of these compounds.

5. The composition of claim 4 wherein the surfactant is a betaine having the structure:

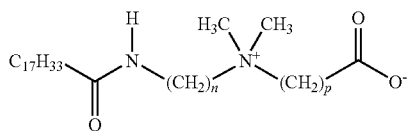

wherein n=3 and p=1.

6. The composition of claim 4 wherein the surfactant is a betaine having the structure:

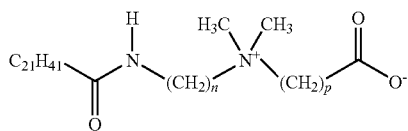

wherein n=3 and p=1.

7. The composition of claim 1 wherein the inorganic acid is selected from the group consisting of hydrochloric acid, sulfuric acid, nitric acid, and a mixture of any of these acids with boric acid.

8. The composition of claim 7 wherein the inorganic acid is hydrochloric acid.

9. The composition of claim 1 wherein the organic acid is selected from the group consisting of formic acid, citric acid, acetic acid, lactic acid, methyl sulfonic acid and ethyl sulfonic acid.

10. The composition of claim 9 wherein the organic acid is selected from the group consisting of formic acid, acetic acid and citric acid.

11. The composition of claim 1 further comprising an alcohol selected from the group consisting of methanol, ethanol, propanol, isopropanol, ethylene glycol and propylene glycol.

12. The composition of claim 11 wherein the alcohol concentration is from about 1 to about 10 weight percent.

13. The composition of claim 12 wherein the alcohol is methanol.

14. The composition of claim 1 wherein the surfactant is present in an amount between about 1 to about 6 weight percent active ingredient.

15. The composition of claim 1 wherein the inorganic acid is present in an amount between about 6 to about 15 weight percent.

16. The composition of claim 1 wherein the organic acid is present in an amount between about 5 to about 15 weight percent.

17. The composition of claim 1 further comprising one or more of a corrosion inhibitor, an iron control agent, and a chelating agent.

18. A self-diverting pre-flush sandstone acid comprising water,
an acid-hydrolyzable surfactant capable of forming a viscoelastic gel,
the surfactant having the following amide structure:

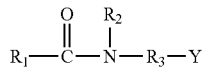

wherein $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 10 carbon atoms; and Y is an electron withdrawing group rendering the amide group difficult to hydrolyze;

an inorganic acid in an amount from about 6 to about 20 weight percent, and an organic acid in an amount from 1 to about 20 weight percent; the fluid capable of an increase in viscosity of at least about 50 cP at 170 $\sec^{-1}$ upon neutralization of less than about one third of the total acid by reaction with carbonate ion, wherein said self-diverting composition increases in viscosity of at least about 50 cP at 170 $\sec^{-1}$ upon neutralization of less than about one third of the total acid, and hydrolysis of the surfactant in the gel, once formed, at a given temperature and pH takes more than at least one hour longer than the acid treatment, as determined by reduction of the viscosity of the fluid to less than 50 cP at a shear rate of 100 $\sec^{-1}$.

19. The composition of claim 2 wherein Y comprises an amine oxide.

* * * * *